United States Patent
Sato et al.

(10) Patent No.: US 7,222,103 B2
(45) Date of Patent: May 22, 2007

(54) PORTAL SITE FOR SERVING DATA MONITORED AND OBSERVED AND METHOD OF USING DATA MONITORED AND OBSERVED

(75) Inventors: Yasuo Sato, Hitachi (JP); Chihiro Fukui, Tokyo (JP); Hideaki Suzuki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 10/368,382

(22) Filed: Feb. 20, 2003

(65) Prior Publication Data

US 2003/0154100 A1    Aug. 14, 2003

Related U.S. Application Data

(63) Continuation of application No. 10/101,445, filed on Mar. 20, 2002.

(30) Foreign Application Priority Data

Jul. 6, 2001    (JP)    .............. 2001-206402

(51) Int. Cl.
    *G06Q 90/00*    (2006.01)
(52) U.S. Cl. .............. 705/52; 705/64; 713/9
(58) Field of Classification Search .............. 705/7–10, 705/26–28, 51–52, 64; 713/178; 707/100–104; 725/9–10; 379/32, 34, 38, 100, 106, 114, 379/133, 265; 700/1, 9–11, 90–91, 108–111, 700/143, 174, 204, 222, 244, 266
    See application file for complete search history.

(56) References Cited

U.S. PATENT DOCUMENTS 6,216,956 B1 * 4/2001 Ehlers et al. .................. 236/47
6,833,787 B1 * 12/2004 Levi ....................... 340/539.13
2002/0128946 A1 * 9/2002 Chehade et al. .............. 705/37
2002/0129019 A1 * 9/2002 O'Brien ......................... 707/6
2003/0018749 A1   1/2003 Sato et al.

FOREIGN PATENT DOCUMENTS

| EP | 810807 A2 * | 12/1997 |
| JP | 1-220719 | 9/1989 |
| JP | 11-126220 | 5/1999 |
| JP | 2001-076012 | 3/2001 |

\* cited by examiner

OTHER PUBLICATIONS

Oureshi et al., "The Accountant and Computer Security", National Public Accountant v42n3, pp. 12-15+, May 1997, ISSN: 0027-9978.*

*Primary Examiner*—Mary D. Cheung
(74) *Attorney, Agent, or Firm*—McDermott Will & Emery LLP

(57) ABSTRACT

A portal site for serving data monitored and observed, which can not only act for monitoring and observing services, instead of a facility owner, but also process the data into economically valuable data with the use of the result of monitoring and observation, is connected to a computer network so as to gather sequential data which is observed in time series by a not less than one sensor as to an operation running condition of a facility belonging the facility owner, and event data monitored invariantly, and incorporates a function of obtaining a data disclosure profile for designating a degree of disclosure of the data, from the facility owner, and a function of onerously serving an item of secondary data obtained by processing the data in a range satisfying the data disclosure profile, to a data user different from the facility owner.

4 Claims, 18 Drawing Sheets

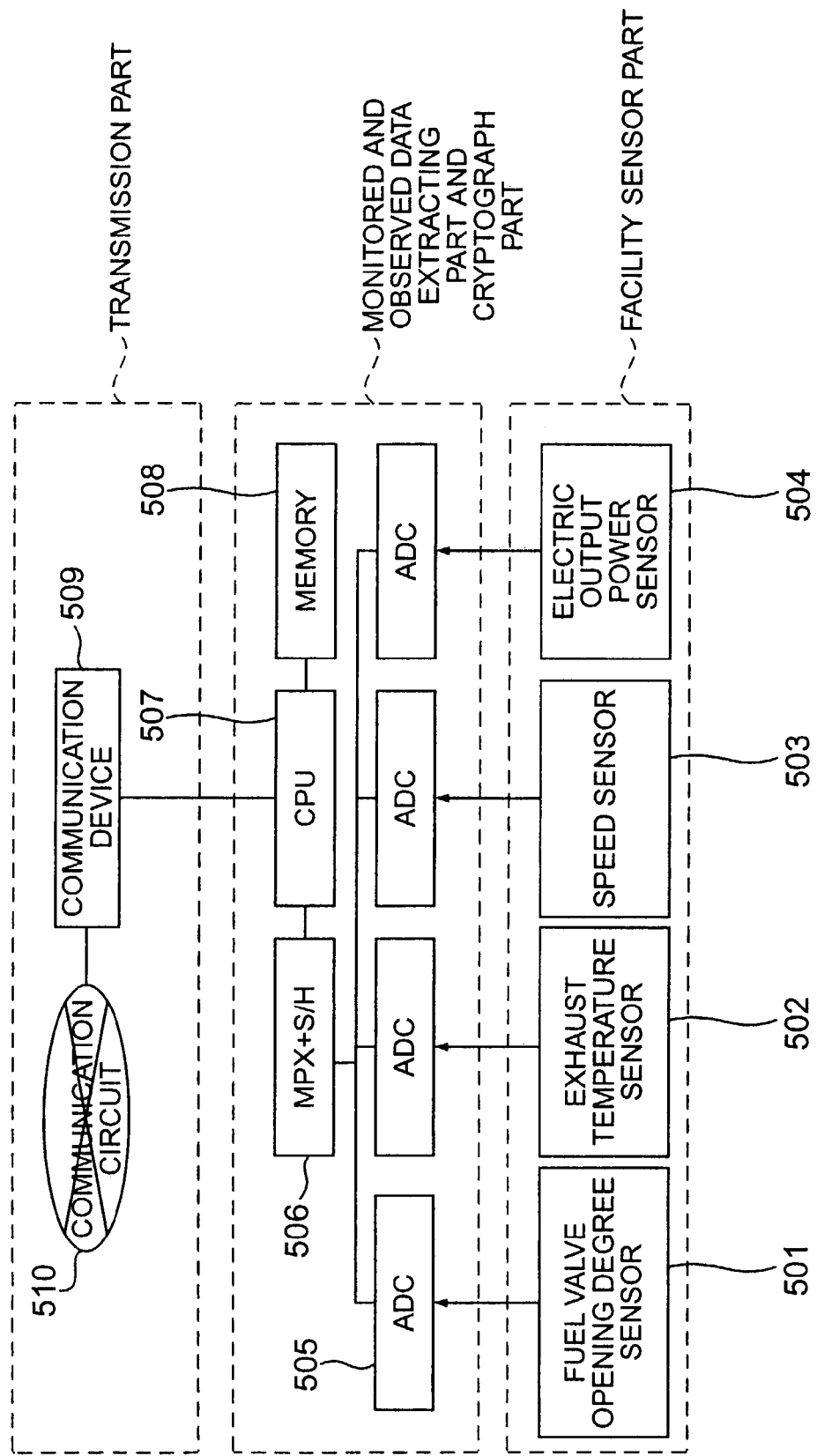

FIG. 6

```
<journal><title>journal 357</title>
<date>2000.01.01</date><time>12.34.56</time>
<author>identifier for monitored and observed data extracting data 01234<author>
<chapter>    <unit>abc</unit>
             <alarm>      <a-title>irregular over speed </a-title>
                          <a-date>2000.01.01</a-date>
                          <a-time>12.34.50</a-time>
                          <a-name>speed</a-name>
                          <a-level>level1</a-level>
                          <a-value>1234</a-value>
                          <a-value-unit>1/min</a-value-unit></alarm>
                          ⎰
                         601
             <record>     <r-title>record123</r-title>
                          <r-date>2000.01.01</r-date>
                          <r-time>12.30.00</r-time>
                          <r-name>speed</r-name>
                          <r-type>double</r-type>
                          <r-value>123.456</r-value>
                          <r-value-unit>1/min</r-value-unit></record>
                          ⎰
                         602
              ⁚
</chapter>
</journal>
```

FIG. 7

701 FACILITY DATA TO BE MONITORED AND OBSERVED

| NAME | FACILITY OWNER | FACILITY KIND | PRODUCTION DATE | .. | MONITORING AND OBSERVING ITEM |
|---|---|---|---|---|---|
| ABCxx | ABC Corp. | DIESEL G | 1987.6.5 | .. | Table ABC00 |
| DEyy | DE Ltd. | GT | 1999.9.9 | .. | Table DE00 |
| : | : | : | : |  | : |

702 MONITORING AND OBSERVING ITEM LIST

| NAME | UNIT | KIND | INTERVAL | ACCURACY | .. | DISCLOSURE PROFILE |
|---|---|---|---|---|---|---|
| FUEL VALVE OPENING DEGREE | m²/sec | SQ | 60 | 60 | .. | Table ABC100 |
| EXHAUST TEMPERATURE | °C | SQ | 60 | 60 | .. | Table ABC101 |
| SPEED | 1/min | SQ | 1 | 1 | .. | Table ABC102 |
| ELECTRIC POWER OUTPUT | kW | SQ | 1 | 1 | .. | Table ABC103 |
| START AND STOP | — | EV | - | - | .. | Table ABC105 |
| : | : | : | : | : |  |  |

703 DISCLOSURE PROFILE (SEQUENTIAL DATA TYPE)

| DISCLOSURE RANGE | SECRET | SIZE | FRESHNESS | MAXIMUM | MINIMUM | AVERAGE | .. |
|---|---|---|---|---|---|---|---|
| ENTIRE RANGE | STATISTIC DISCLOSURE | PER MINUTE | PREVIOUS DAY | POSSIBLE | POSSIBLE | POSSIBLE | .. |
| GROUP A | SECRET DISCLOSURE | PER SECOND | INSTANT VALUE | POSSIBLE | POSSIBLE | POSSIBLE | .. |
| : | : | : | : | : | : | : |  |

704 DISCLOSURE PROFILE (EVENT DATA TYPE)

| DISCLOSURE RANGE | SECRET | TIME | FRESHNESS | FREQUENCY | TIME PERIOD | .. |
|---|---|---|---|---|---|---|
| ENTIRE RANGE | STATISTIC DISCLOSURE | NO | PREVIOUS DAY | POSSIBLE | POSSIBLE | .. |
| GROUP A | SECRET DISCLOSURE | MINUTE | INSTANT VALUE | POSSIBLE | POSSIBLE | .. |
| : | : | : | : | : | : |  |

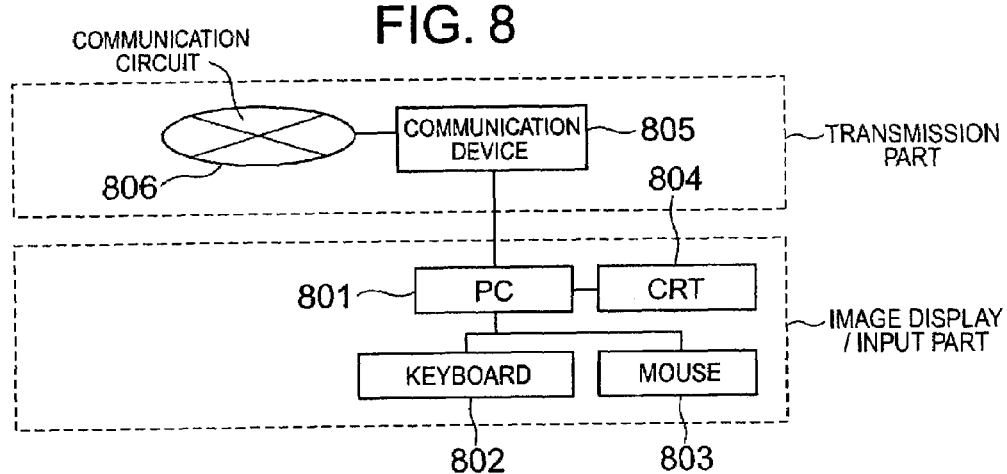
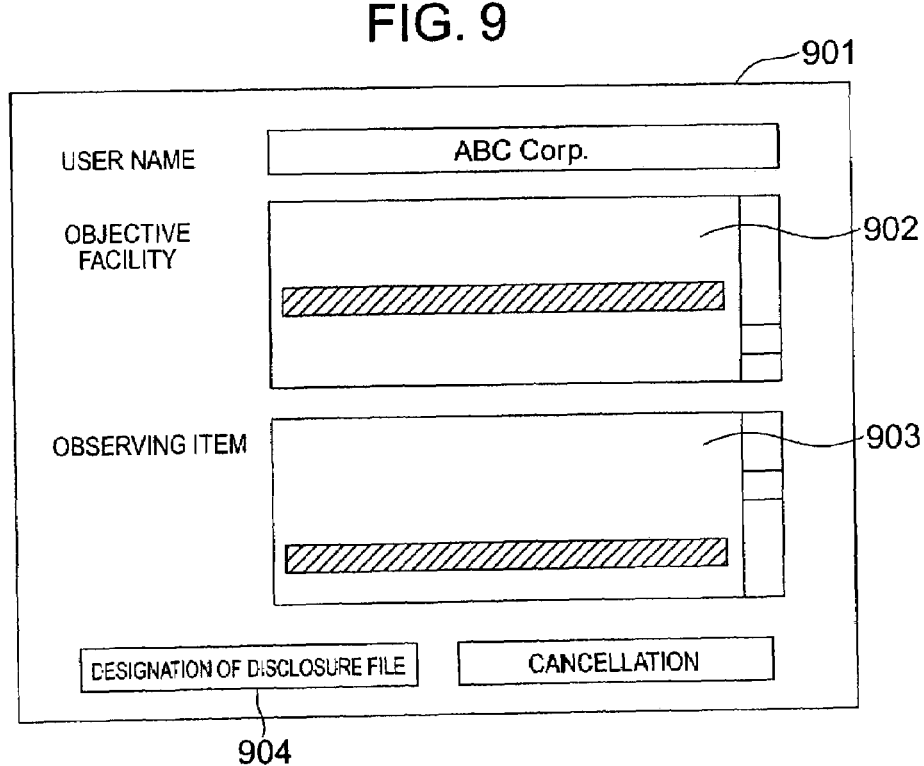

FIG. 10

USER NAME     ABC Corp.

OBJECTIVE FACILITY     ABC xx

OBSERVING ITEM     FUEL VANE OPENING DEGREE

DIDCLOSURE RANGE

SECRET DESIGNATION     ● SECRET DISCLOSURE    ○ REAL NAME DISCLOSURE

↳ WHETHER STATISTICS CAN BE USED OR NOT?    ○ YES   ● NO

SIZE     ○ EVERY HOUR    ● EVERY MINUTE    ○ EVERY SECOND

FRESHNESS     ○ PREVIOUS MONTH VALUE    ● PREVIOUS DATA VALUE    ○ INSTANT VALUE

STATISTIC USE

| | | |
|---|---|---|
| MAXIMUM VALUE | ● POSSIBLE | ○ IMPOSSIBLE |
| MINIMUM VALUE | ● POSSIBLE | ○ IMPOSSIBLE |
| DAY AVERAGE | ● POSSIBLE | ○ IMPOSSIBLE |

EQUIVALENT FOR SERVING DATA IN THE ABOVE-MENTIONED DESIGNATION    xxxxxx    [DETAILS]

THIS SETTING BECOMES EFFECTIVE FROM yyyy/mm/dd/

[ OK ]     [ CANCELLATION ]

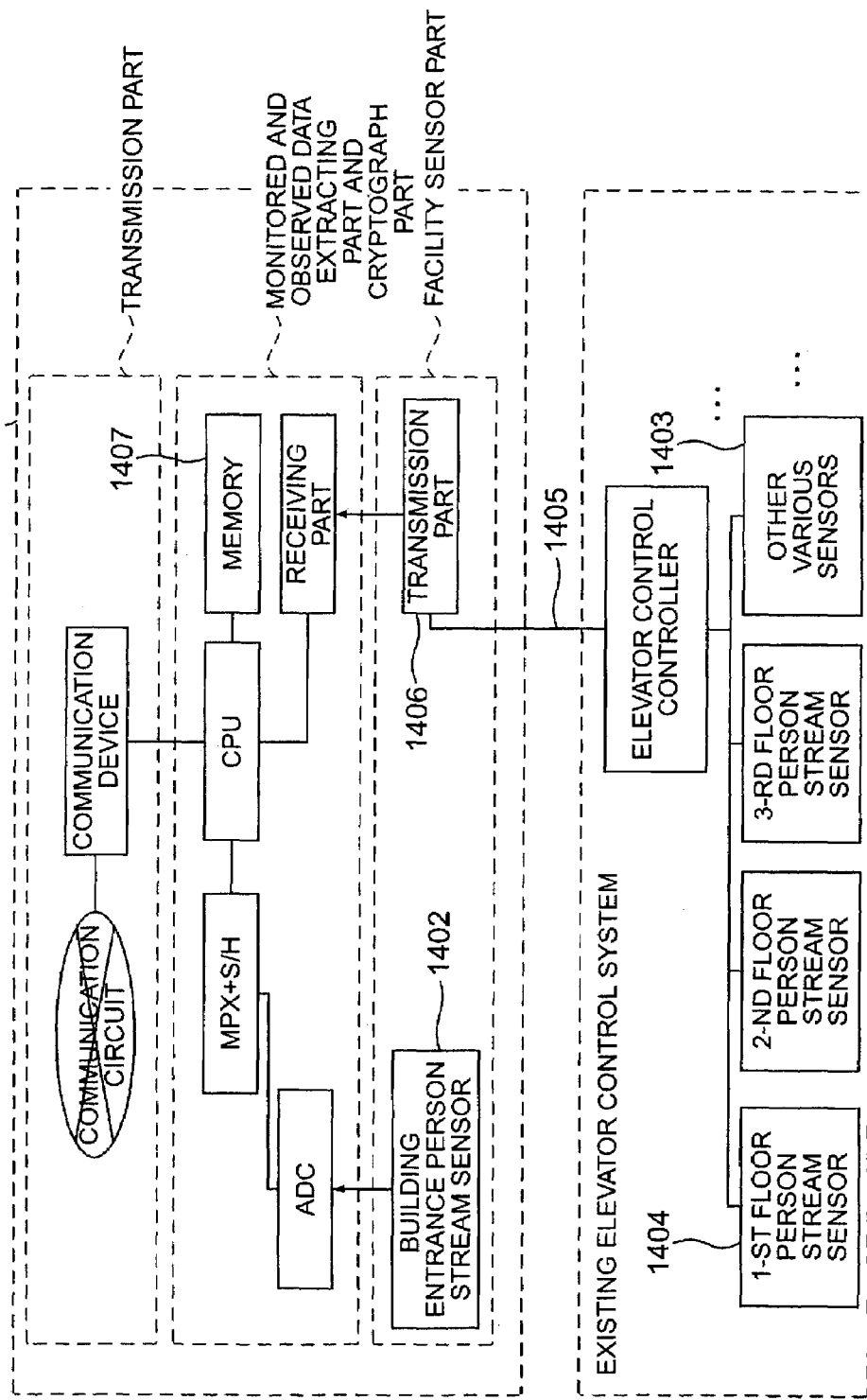

FIG. 15

```
<journal><title>journal369</title>
<date>2000.01.01</date><time>12.34.56</time>
<author> identifier of monitored and observed data extracting part 4567<author>
<chapter>   <unit>abc</unit>
            <record>    <r-title>record123</r-title>
                        <r-date>2000.01.01</r-date>
                        <r-time>12.30.00</r-time>
                        <r-name>person</r-name>
                        <r-type>integer</r-type>
                        <r-value>123</r-value>
                        <r-value-unit>person/min</r-value-unit></record>
                  ..
</chapter>
</journal>
```

1601 MONITORING DATA TO BE MONITORED AND OBSERVED

| NAME | FACILITY OWNER | FACILITY KIND | PRODUCTION DATE | .. | MONITORING AND OBSERVING ITEM |
|---|---|---|---|---|---|
| ABCxx | ABC Corp. | DIESEL G | 1987.6.5 | .. | Table ABC00 |
| DEyy | DE Ltd. | GT | 1999.9.9 | .. | Table DE00 |
| XYZa | Xyz | BUILDING | 19791.1 | .. | Table XYZ01 |
| XYZb | Xyz | BUILDING | 1984.7.7 | .. | Table XYZ02 |
| : | : | : | : | | : |

1602 MONITORING AND OBSERVING ITEM LIST

| NAME | UNIT | KIND | INTERVAL | ACCURACY | .. | DISCLOSURE PROFILE |
|---|---|---|---|---|---|---|
| ENTRANCE PERSON STREAM | PERSONS/min | SQ | 60 | 2 | .. | Table XYZ100 |
| 1-st FLOOR PERSON STREAM | PERSONS/min | SQ | 60 | 2 | .. | Table XYZ101 |
| 2-nd FLOOR PERSON STREAM | PERSONS/min | SQ | 60 | 2 | .. | Table XYZ102 |
| 3-rd FLOOR PERSON STREAM | PERSONS/min | SQ | 60 | 2 | .. | Table XYZ103 |
| : | : | : | : | : | | |
| : | : | : | : | : | | |

1603 DISCLOSURE PROFILE (SEQUENTIAL DATA TYPE)

| DISCLOSURE RANGE | SECRET | SIZE | FRESHNESS | MAXIMUM | MINIMUM | AVERAGE | .. |
|---|---|---|---|---|---|---|---|
| ENTIRE RANGE | STATISTIC DISCLOSURE | PER MINUTE | PREVIOUS DAY | POSSIBLE | POSSIBLE | POSSIBLE | .. |
| GROUP A | REAL NAME DISCLOSURE | PER HOUR | INSTANT VALUE | POSSIBLE | POSSIBLE | POSSIBLE | .. |
| : | : | : | : | : | : | : | : |

FIG. 17

```
                                    1702        1701
                                    /          /
┌─────────────────────────────────────────────────┐
│                                                 │
│  USER NAME  BUIL MTN.                           │
│                                          1703   │
│             PERSON STREAM VOLUME THROUGH        │
│  DATA NAME  ENTRANCE OF XX DISTRICT BUILDING    │
│                                                 │
│             STATISTIC VALUE FIVE XX             │
│  DATA OUTLINE BUSINESS BUILDINGS (SKY-SCRAPER) [DETAIL] │
│                                                 │
│  SEQUENTIAL DATA WITH INTERVALS OF MINUTES (INSTANT VALUE) │
│                                                 │
│                              [RELEVANT DATA]    │
│                                                 │
│  EQUIVALENT FOR                                 │
│  ACQUIRING DATA  XXXXXX                         │
│   TRANSMISSION OF THIS DATA IS CARRIED OUT FROM yyyy/mm/dd/hh/mm │
│                                                 │
│        [  CONTRACT  ]    [ CANCELLATION ]       │
│                                                 │
└─────────────────────────────────────────────────┘
```

FIG. 18

```
                                    1802        1801
                                    /          /
┌─────────────────────────────────────────────────┐
│                                                 │
│  USER NAME  BCD Market.                         │
│                                                 │
│  DATA NAME  VOLUME OF PERSON STREAM AT FIFTH FLOOR IN Xyz BUILDING │
│                                          1803   │
│             VOLUME OF PERSON STREAM AT          │
│  DATA OUTLINE FIFTH FLOOR IN Xyz BUILDING  [DETAIL] │
│                                                 │
│  SEQUENTIAL DATA WITH INTERVALS OF MINUTES (ONE HOUR LAG) │
│                                                 │
│   [DEMAND OF PROCESSING]    [RELEVANT DATA]     │
│                                           1804  │
│  EQUIVALENT FOR  XXXXXX                         │
│  ACQUIRING DATA                                 │
│   TRANSMISSION OF THIS DATA IS CARRIED OUT FROM yyyy/mm/dd/hh/mm │
│                                                 │
│        [  CONTRACT  ]    [ CANCELLATION ]       │
│                                                 │
└─────────────────────────────────────────────────┘
```

PORTAL SITE FOR SERVING DATA MONITORED AND OBSERVED AND METHOD OF USING DATA MONITORED AND OBSERVED

CROSS-REFERENCE TO RELATED APPLICATION

This application is a continuation of application Ser. No. 10/101,445 filed Mar. 20, 2002.

BACKGROUND OF THE INVENTION

The present invention relates to a system for monitoring and observing data obtained by sensing from various kinds of facilities and a method of using the date, and in particular to a monitoring and observing portal site for building up, on a network of several computers, a means for producing a secondary process configuration of data obtained by monitoring and observing a certain facility, for an application used for a purpose different from that during the build-up of the system, and a method of using data monitored and observed.

RELATED ART

Heretofore, in a field in which various kinds of data are used, there are presented several data dissemination services for carrying out data transmission between data producing sources and use ends. However, the number of publicly known data dissemination services which are limited to data monitored and observed is less, due to such a problem that the infrastructure therefor has not been sufficiently arranged in order. However, in view of systems for different businesses, a certain configuration in future can be imaged.

For example, JP-A-11-126220 discloses a data dissemination system for specifications, that is, it discloses such a method that a device for managing transmission of specification data is provided in order to carry out data transmission. Further, JP-A-1-220719 discloses a system for disseminating images.

Any of publicly known examples stores data obtained from a data producing source, once in a server, and then, with the use of method of data retrival, which has been specialized for a characteristic of data to be handled, a data user at a data use end takes up the data. That is, the data user actively accesses a data base.

Consideration will be made such that data services for data monitored and observed are carried out in view of the above-mentioned publicly known examples in order to collect and develop on the network sequential data which are observed by sensors in time-series as to an operating condition of a facility or event data which are irregularly monitored.

First, in this case, it must be considered that the volume of date stored in a server is enormous. Further, it is required to accommodate data observed on a real-time base in a data base, and the hold the data until it is disseminated. This causes a serious problem that a heavy burden is exerted to the server if several facilities and data users are present, and further it is considered, the longer the time required for processing the data, the lower the real-time ability. Thus, there is required such a contrivance that the data user can promptly use data monitored and observed.

Next, it must be also considered that the characteristic of data is different from that in the publicly known examples.

It is unusual to subject sequential data and event data to data retrieval in view of their contents. Although an item of data to be observed, that is, the framework of data to be observed, has a fixed content, data can hardly extracted form a set of numerals which are dynamically observed for the item of data. Accordingly, such a conventional concept that accumulated semantic data are searched for is inappropriate. There is required a new concept for disseminating and managing data monitored and observed, in view of data items of data managed and observed.

SUMMARY OF THE INVENTION

An object of the present invention is to provide a portal site for data monitored and observed, and a method of using data monitored and observed, which can not only carry out monitoring and observation of a facility, instead of an owner of the facility, but also use and process data as the result of the monitoring and observation so as to obtain economically valuable data.

Another object of the present invention is to provided a portal site for data monitored and observed, and a method of using data monitored and observed, with which a data user can obtain data produced by monitoring and observing various kinds of facilities, and data produced by processing the former data without the necessity of an investment for setting up an infrastructure for monitoring and observing the facilities by himself.

Further, another object of the present invention is to provide a portal site for data monitored and observed, and a method of using data monitored and observed, which can carry out exchange of data having been produced by processing data obtained through monitoring and observing businesses, between owners of facilities and data users, while manages security and cloaking in of secret in order to serve both owners of facilities and data users.

To the end, according to the present invention, there is provided a portal site for data monitored and observed, which gathers sequential data obtained by observing, in time series, an operating condition of a facility belonging to an owner, or event data obtained by irregularly observing the same with the use of not less than one of sensors, characterized by a function of obtaining a data disclosure profile for designating a degree of disclosure of the above-mentioned data, from the owner of the facility, and a function of onerously serving to a data user other than the owner of the facility, items of secondary use data which is obtained by processing the above-mentioned data within a range that satisfies the above-mentioned data disclosure profile.

According to the present invention, the portal side for serving data monitored and observed manages the characteristics of items of data monitored and observed, as to a facility to be monitored and measured. A data disclosure profile for designating a degree of disclosure for the above-mentioned data monitored and observed is acquired from a manager (terminal) on the facility owner side by way of a computer network. Meanwhile, there is incorporated a function such that items of data which would be obtained in future by processing the above-mentioned data are disseminated in order to advertise for data users. A data user judges data monitored and observed, which has been not yet obtained but which would be obtained in future, by the characteristics of the items of data, and then he orders the portal site an offer to use the data. That is, the data user judges the use of data in future from the profile which has been specialized to the data monitored and observed after checking the profile. Contracts by data users are all be made on the computer network. Accordingly, users for secondary use data using items of data which are now being observed are updated whenever required. In other words, a data user can have a capability of making an order to use data which is now being observed, at any time.

Further, for data users who have made the contract to use data, services for disseminating data desired by the data users are offered. In particular, after the contract is made, data which are observed on a real time base is suitably processed into secondary use data which is then disseminated timely. The dissemination of data is also carried out on the computer network. Further, an authenticating function and a cryptographic function are incorporated in order to allow dissemination of data only for the contracted data users.

The portal site according to the present invention not only carries out monitoring and observing services for a facility owner, but also prepares processed data which is obtained by various computations including statistics with the use of the result of monitoring and observation. Further, the portal site sells thus obtained processed data as secondary use data to data users, instead of the facility owner who can therefore earn an equivalent to the value of the data which have been considered to be commercially invaluable.

On the contrary, a data user can acquire monitored and observed data from various facilities, and secondary use data obtained by processing the former data without the necessity of an initial investment for setting up a monitoring and observing infrastructure by himself. This can be made on a real time base or through a configuration within a range which is allowed by the facility owner around the real time base. In view of this point, the value of data can be jumped up, in comparison with processed data which have been laboriously aggregated.

The portal site for serving data monitored and observed executes the exchange of data for the facility owner, and carries out the management of security and cloaking in secret, thereby to offer the facility owners and data users services.

Explanation will be hereinbelow made of preferred embodiments of the present invention with reference to the accompanying drawings in which:

BRIEF DESCRIPTION OF THE DRAWINGS

FIG. 5 is a view illustrating a configuration of devices around a facility belonging to a facility owner in a third embodiment of the present invention;

FIG. 6 is a view showing data monitored and observed in the third embodiment of the present invention;

FIG. 7 is a view showing profile data base in the third embodiment of the present invention;

FIG. 8 is a view illustrating a configuration of devices around a manager belonging to a facility owner in the third embodiment of the present invention;

FIG. 9 is a view illustrating a selection image for a disclosure profile in the third embodiment of the present invention;

FIG. 10 is a view illustrating a designation image of the disclosure profile in the third embodiment of the present invention;

FIG. 14 is a view illustrating a configuration of devices around a manager belonging to a facility owner in a fourth embodiment of the present invention.

FIG. 15 is a view illustrating an example of data monitored and observed in the fourth embodiment of the present invention;

FIG. 16 is a a view illustrating a profile data base in the fourth embodiment of the present invention;

FIG. 17 is a view illustrating a screen of a first portion of a contracting procedure in the fourth embodiment of the present invention;

FIG. 18 is a view illustrating a second portion of an image of the contracting procedure in the fourth embodiment of the present invention;

DETAILED DESCRIPTION OF THE INVENTION

Figure 1:
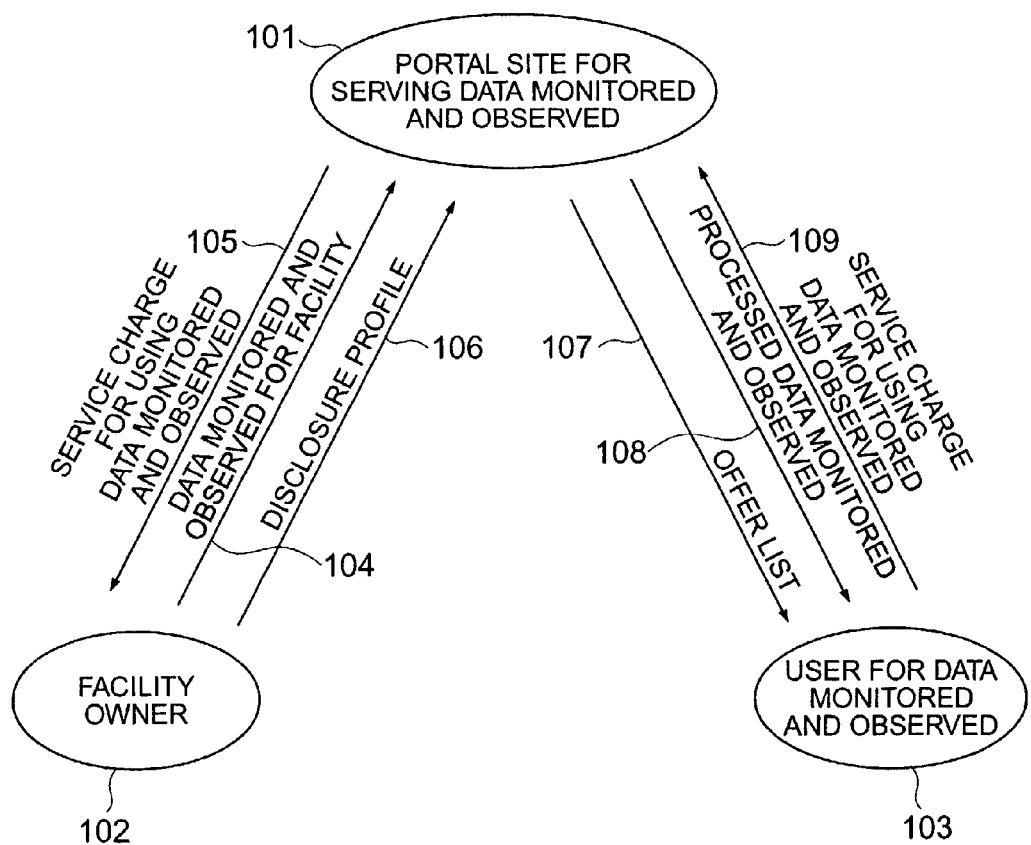
FIG. 1 is a view showing a concept of a business configuration according to the present invention.
Figure 2:
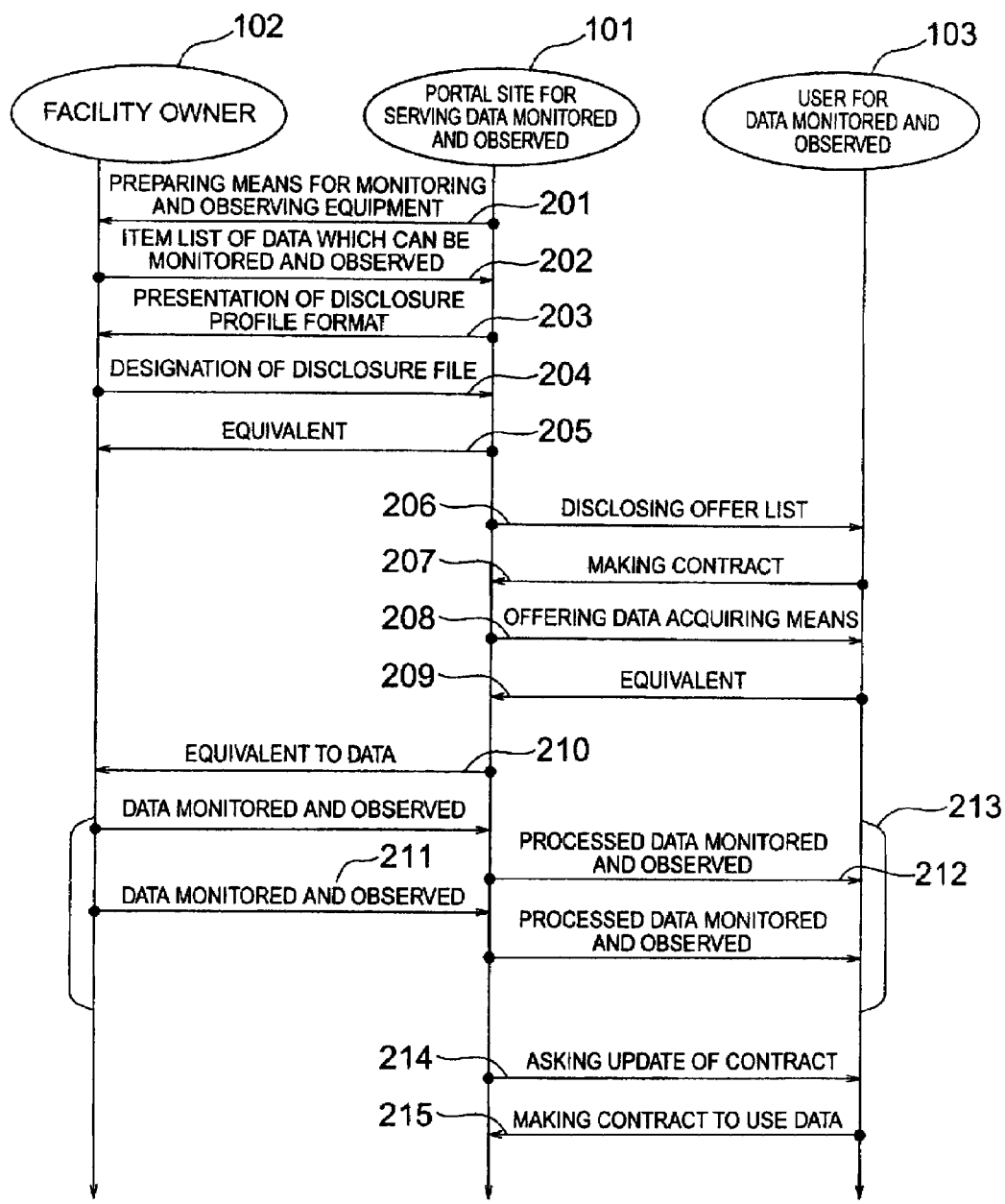
FIG. 2 is a view illustrating process steps of the business configuration shown in FIG. 1.

At first, explanation will be hereinbelow made of a business configuration of the present invention with reference to FIGS. 1 and 2 among which FIG. 1 is a view illustrating a concept of a business configuration of the present invention; and FIG. 2 is general proceedings of a business according to the present invention in time series.

Referring to FIG. 1, there are shown a portal site 101 for serving data monitored and observed, a facility owner 102 and a monitored and observed data user 103. The portal site 101 for serving data monitored and observed has a monitoring and observing means for a facility to be monitored and observed, belonging to the facility owner 102.

The portal site 101 for serving data monitored and observed pays an equivalent 105 to data 104 monitored and observed, which is obtained from the facility 104, to the facility owner 102, in exchange of a right to acquire the data 104 after the present time. The portal site 101 for serving data to be monitored and observed processes the data monitored and observed, in order to aim at secondarily using the data, and resells secondary data obtained by this processing. It is possible to allow the facility owner to designate a disclosure profile 106 as to an allowable range of using the data.

Meanwhile, the portal site 101 for serving data monitored and observed creates a service list 107 of groups of secondary data scheduled to be obtained by processing data monitored and observed, which may be obtained in future, and then broadly advertises for data users 103. When a user using the data monitored and observed is found, the portal site 101 provides a means for successively transmitting newest values of the data 108 monitored and observed, to the user 103 using the data monitored and observed, and then gains an equivalent 106 to the data. The portal site 101 for serving data monitored and observed can gain a benefit which is a difference between the data equivalent 105 and the data equivalent 109.

Each of terminal units which constitute the portal site 101 for serving data monitored and observed, the facility owner 102 and the user 103 using data to be monitored and observed is composed of computer, and it includes a control panel and an image display/input part (browser). The above-mentioned terminal unit incorporates a predetermined program which runs on the computer so as to monitor an operating condition of a facility, process data and so forth, and a communication control means. Further, all terminal units are connected to one another through the intermediary of a transmission network.

With the above-mentioned configuration as a background, a general business mechanism according to the present invention will be explained with reference to FIG. 2.

At first, the portal site 101 for serving data monitored and observed, makes a preparation 201 for a monitoring and observing means for a facility to be monitored and observed, for the facility owner who owns the facility. This monitoring and observing means is a property which may belong to either the portal site 101 for serving data monitored and observed or the facility owner. A device which constitutes the means acts to the facility to be monitored and observed. Simultaneously, the portal site 101 for serving data monitored and observed acquires an item list 202 for monitoring and observation from the facility.

The facility owner 102 can designate items of data which will be monitored and observed in future by the above-mentioned monitoring and observing means, and which can be secondarily used and resold, to the portal site 101 for serving data monitored and observed. Accordingly, a disclosure profile is prepared therefor as a regulated format which can designate degrees of secondary use and disclosure of data to be monitored and observed.

The portal site 101 for serving data monitored and observed prepares disclosure profile formats for facility owners corresponding to the item list 202. Then, the presentation 203 of the disclosure profiles are made for the facility owners 102 so as to provide such an environment that regulated data can be promptly delivered.

The designation 204 of any of the disclosure profiles is designated by the facility owner 102 so as to inform of whether data obtained by monitoring and observing his facility can be secondarily used and resoled or not. It is noted that the facility owner 102 discloses valuable data which is adapted to be secondarily used (that is, secondary use data), and accordingly, he can gain a certain equivalent to an assignment of a right to monitor and observe the facility, from the portal site 101 for serving data monitored and observed.

Next, the portal site 101 for serving data monitored and observed, makes up items of processed data which can be provided in future to the third party in view of the disclosure profile 204. As to items of data to be monitored and observed in the item list 202, the portal site 101 for serving data monitored and observed maps out a plan for preparing process data which is more valuable, with the use of data which will be obtained in future. The items of processed data on the plan are organized so as to formulate an offer list. Further, the portal site 101 for serving data monitored and observed gathers and collects data monitored and observed, which can be served in future, from several facility owners, in order to plan the creation of valuable processed data.

Thus, the disclosure 206 of the offer list prepared as mentioned above is made for traders who are to be users 103 for data monitored and observed so as to broadly advertise for users for data monitored and observed. Privacy data is concealed in the form of the offer list. That is, only outlines of data which can be served in future from the present time are disclosed. The outlines of the right to observation can be listed up as commodities, and be broadly disclosed among several users.

Of users who look through the service list 206, a user who desires to use some of data monitored and observed in the list, makes a contract 207 with the portal site 101 for serving data monitored and observed. That is, the contracter becomes a user 103 for using data monitored and observed. The portal site 101 for serving data monitored and observed makes a provision 208 of a means for acquiring data as to processed data monitored and observed, for the user for using data monitored and observed. Thus, the user 103 for using data monitored and observed pays an equivalent 209 to the processed data monitored and observed which can be obtained in future, to the portal site 101 for serving data monitored and observed. In view of a kind of data to be monitored and observed and a configuration of the contract, a part of the equivalent 209 may be paid to the facility owner in the form of an equivalent 210.

The user 103 for using data monitored and observed, who receives the provision 208 of the data acquiring means is successively served with data 211 monitored and observed, and processed data 212 which is obtained by anytime processing data 211 monitored and observed, in the portal site 101 for serving data monitored and observed. At this stage, a part of the data is concealed in view of the disclosure profile 204 designated by the facility owner 102.

The user 103 for using data monitored and observed can repeat the successive acquirement of the processed data 212 monitored and observed in a future predetermined period 213. This period is the right corresponding to the equivalent 209.

After the predetermined period lapses, the portal site 101 for serving data monitored and observed asks user 103 for using data monitored and observed a request 214 for updating the contract. If the contract is updated again, the process steps subsequent to step 204 shown in FIG. 2 are repeated.

Explanation has been hereinabove made roughly of the mechanism of business in time series in the portal site 101 for serving data monitored and observed, with respect to a single facility owner and a single user 103 for using data monitored and observed as a partner, with reference to FIG. 2. Similar business contents are actually made simultaneously in parallel for a plurality of facility owners and a plurality of users for using data monitored and observed. These operation will be detailed later in another embodiments which will be hereinbelow described, and in which the contents incorporating specific applications will be explained.

Figure 3:
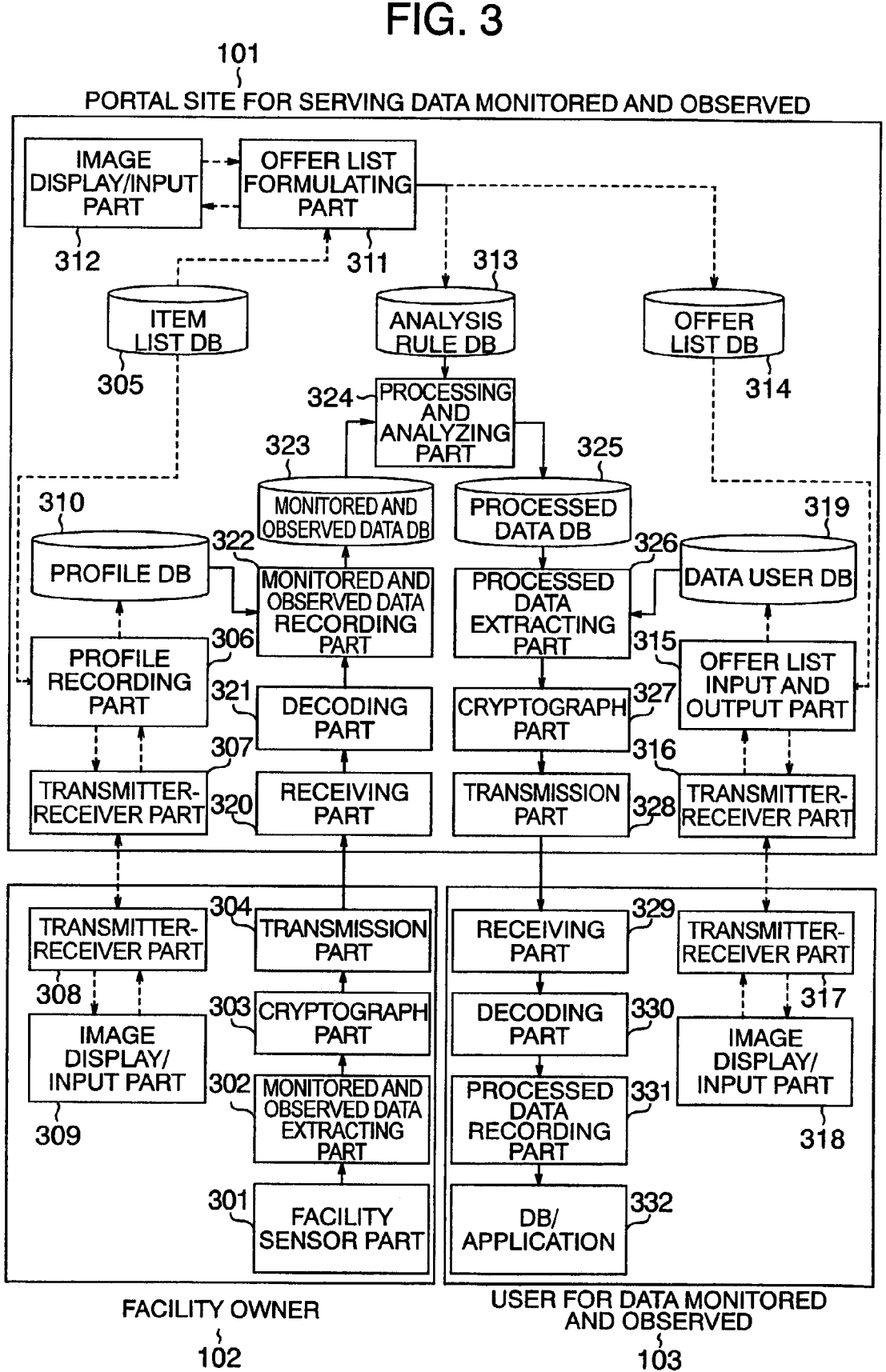
FIG. 3 is a schematic view illustrating a system configuration in one embodiment of the present invention.

Next, explanation will be hereinbelow made of a first embodiment of a configuration of an apparatus according to the present invention with reference to FIG. 3 which exhibits a functional correlation among the portal site 101 for serving data monitored and observed, the facility owner 102 and the user 103 for using data monitored and observed. It is noted that FIG. 3 shows not only a human system, that is, the owner, but also devices relating to the facility located in the site within the block of the facility owner 102. Further, the flow of data among functions are indicated by arrows. The solid arrows indicate invariant data flows synchronized with acquirement of data monitored and observed, and dotted allows indicate noninvariant data flows such as contracts with the facility owner 102 and the user 103 for using data monitored and observed.

Subsequently, referring to FIG. 3, various functions will be explained while the mechanism of the business explained above with reference to FIG. 2 will be also referred to. At first, the entire configuration of the correlation among functions will mainly be explained. The contents of specific packages of the functions will be detailed in other embodiments which will be explained later.

At first, explanation will be made of process steps for carrying out the preparation 201 of the monitoring and observing means and the acquirement of the item list 202 by the portal site 101 for serving data monitored and observed at an initial stage of a series of businesses. The portal site 101 for serving data monitored and observed installs a new facility sensor part 301 or improves an existing facility in the facility owner 102 since the above-mentioned process steps involve the facility sensor part 301.

Further, a monitored and observed data extracting part 302, a cryptograph part 303 and a transmission part 304 are arranged in order to transmit a signal obtained by the facility sensor part 301, as external data. The monitored and observed data extracting part 302 has a function of converting an output signal from the facility sensor part 301, into a transmitting configuration. The cryptograph part 303 is provided so as ensure a secret during transmission, and accordingly, data encrypted is transmitted to the portal site 101 for serving data monitored and observed, by means of the transmission part 304.

Thus, an item of data monitored and observed, for which an equipment for acquiring data monitored and observed, and a transmission equipment have been prepared, becomes an item which can be monitored and observed. After the completion of installation of the above-mentioned monitoring and observing means, the item list 202 relating to the above-mentioned facility, is added to an item list data base 305.

Next, explanation will be made of the procedures for the presentation 203 of the disclosure profile and the designation 204 of the disclosure profile. As explained through process steps 203, 204 in FIG. 2, the facility owner 102 can designate whether or not data which will be monitored and observed can be secondarily used or resold, to the portal site 101 for serving data monitored and observed. Accordingly, the portal site 101 for serving data monitored and observed prepares therefore a disclosure profile format for the facility owner 102. A profile recording part 306 formulates the disclosure profile format for each of facility owners on the basis of an item list data base 305. On the basis of the HTML format, this profile is formulated. Further, the presentation 203 of the disclosure profile is set up on an internet web server in a transmitter-receiver part 307 in order to open the disclosure profile to the facility owner 102.

The facility owner 102 inputs regulated data on an internet web browser environment which is set up by the transmitter-receiver part 308 and a display input part 309, and accordingly, the disclosure profile designation 204 is made. The profile recording part 306 stores profiles for respective facility owners in the profile data base 310. An specific example of the disclosure profile and the input environment will be detailed in the other embodiments which will be explained later.

Next, explanation will be made of functions for carrying out the formulation of an offer list which is carried out in the portal site 101 for serving data monitored and observed. With reference to the item list data base 305 which has been built up through the above-mentioned process steps, consideration is made for processing data which can be monitored and observed, into a reusable form. The manager in the portal site 101 for serving data monitored and observed determines whether or not data causes a problem of secret or whether or not data has high needs on the market, and considers analysis rules for creating new data.

An offer list formulating part 311 carries out the above-mentioned function, and accordingly, incorporates an image display/input part 312 for exchange to and from the human system. With the result of the consideration in this part, a rule for a calculating process of producing processed data from data monitored and observed is stored in an analysis rule data base 313. Further, an item of the processed data is stored in the offer list data gase 314.

A specific example of the rule formulating process is omitted in this embodiment, but will be detailed later in the other embodiments.

After the formulation of the offer list as mentioned above, the plan for creating the processed data from data monitored and observed in future has been drafted. Next, explanation will be made of an operation such that the portal site 101 for serving data monitored and observed presents the offer list to traders who could use the processed data in order to advertise for users for using data monitored and observed, which corresponds to steps 206 and 207 shown in FIG. 2. Rough operation shown in FIG. 3 will be explained. A specific example of the format of the offer list, and an input environment will be detailed in the other embodiments which will be explained later.

Referring to FIG. 3, an offer list input/output part 315 exchanges data to and from a trader as candidate who is to be a user 103 for using data monitored and observed (which will be hereinbelow referred to as a candidate trader) with the use of the functions of a transmitter-receiver parts 316, 317 and an image display/input part 38. At first, the offer list input/output part 315 prepares data of the offer list 314 in the web server connected to the Internet, and then presents on the browser.

The content of the presentation includes a classification, and a degree of accuracy relating to a facility and an item to be observed, and a period. These data has been processed by the portal site 101 for serving data monitored and observed, into a form which can precisely follow the profile designated by the facility owner and which can prevent invasion of privacy of the facility owner.

The candidate trader carries out manipulation such as accesses, retrieval and selection on the image display/input part (browser), and make a contract for an item of data desired to be acquired by him. Contract data is recorded in a data user data base 319. With this contract, the candidate trader becomes a user 103 for using data monitored and observed.

Explanation has been made hereinabove of the noninvariant data flows including a contract with respect to the facility owner 102 and the user 103 for using data monitored and observed, which are indicated by the dotted arrows. The item of data delivered from the facility owner is determined by a series of functions relating to the profile formulating part 306, and the other party to which data after processing is disseminated are set up by a series of functions relating to the offer list input/output part.

Explanation will be hereinbelow made of the invariant data flow which is indicated by the dotted arrows shown in FIG. 3 and which is synchronized with acquirement of data to be monitored and observed. That is, a series of process steps of extracting data monitored and observed from a facility belonging to the facility owner 102, and then serving the data to the user 103 for using data monitored and observed within a period determined by the contract made with the user 103 for using data monitored and observed, will be roughly explained.

The facility belonging to the facility owner 102 is provided therein with the facility sensor part 301, the monitored and observed data extracting part 302, the cryptograph part 303 and the transmission part 304. An output from the facility sensor part 301 is edited by the monitored and observed data extracting part 302 into a transmission configuration, and is then encrypted by the cryptograph part 303. Finally, it is transmitted by the transmission part 304.

A receiving part 320 in the portal site 101 for serving data monitored and observed receives the transmitted signal, and a decoding part 321 decodes the signal into the original data. The cryptograph part 303 and the decoding part 321 are constituted by asymmetric cryptograph systems. The function of the cryptograph part 303 installed in the facility owner 102 is incorporated in such a unit-embedded type so that it cannot be decomposed. Accordingly, data transmitted from the transmission part 304 cannot be decrypted by the third part other than the portal site 101 for serving data monitored and observed.

Next, a monitored and observed data recording part 322 extracts those which can be used as processed data among transmitted data, and records those in the data base. The data which can be used as processed data must follow the profile designated by the facility owner 102. Accordingly, the facility owner profile corresponding to the observation source is referred to in the profile data base 310 as mentioned above. A nondisclosure type item is suitably masked suitably, and is then recorded in a monitored and observed data data base 323. A specific example and a format example will be detailed in the other embodiments which will be explained later.

Next, a processing and analyzing part 324 creates processed data from data monitored and observed. This process rule is written in the analyzing rule data base 313, as mentioned above. In the analyzing rule data base 313, methods of computation are designated to individual data monitored and observed or a group thereof. In view of this fact, the analyzing and processing part 325 creates processed data from data monitored and observed which is successively updated, and stores the processed data into the processed data data base 325. A specific example of the processing and analyzing part 325 is not explained in this embodiment, but will be detailed in the other embodiments which will be explained later.

Next, a processed data extracting part 326 gathers up data to be transmitted to a data user from the processed data base 325, and edits the same into a transmission configuration. In order to disseminate this data to specific data users, that is, contractors, the data is encrypted by a cryptograph part 327 with the use of cryptograph keys which are different among other parties to be disseminated with the data. The data is transmitted to the user 103 for using data monitored and observed by a transmission part 328.

A receiving part 329 belonging to the user 103 for using data monitored and observed, receives the transmitted data through the intermediary of a receiving part 329. This data is decoded into the original data by the decoding part 303 for effecting a decoding function which has been obtained during the contract. Finally, the processed data recording part 331 delivers the data into one of data bases or an application 332 in the data user 103. They are changed into inherent interfaces, respectively, so as to effect the function of inputting data.

With the invariant repetitions of a series of operations indicated by the solid arrows shown in FIG. 3, as mentioned above, data monitored and observed in the facility owner 102 is suitably and timely processed, and thereafter, are automatically dissembled to the user 103 for using data monitored and observed.

As mentioned above, the user for using data monitored and observed, who has made a contract with the portal site 101 for serving data monitored and observed, can acquire desired data with no maintenance for a facility monitored and observed or with no necessity of development of a system or a program. Further, with no invasion of privacy for the facility owner, processed data which is highly valuable, such as statistic data can be acquired. In view of the facility owner's standpoint, there may be offered such an advantage that not only out-sourcing of a build-up of a monitoring system but also selling of data from a certain facility can be sold to a plurality of data users. Further, even after the build-up of the observing system, a new third party to be served, can be added at the portal site for serving data monitored and observed. By creating processed data with a high added value from data delivered from a plurality of facilities, the number of third parties to be served with the processed data can be increased. That is, data monitored and observed can be processed into effective payable contents.

Explanation has been made of the first embodiment shown in FIG. 3, in which all data monitored and observed is once gathered up in the portal site. However, a configuration in which monitored data that is not used in a statistic process is transmitted with no way of the portal site may be considered.

Figure 4:
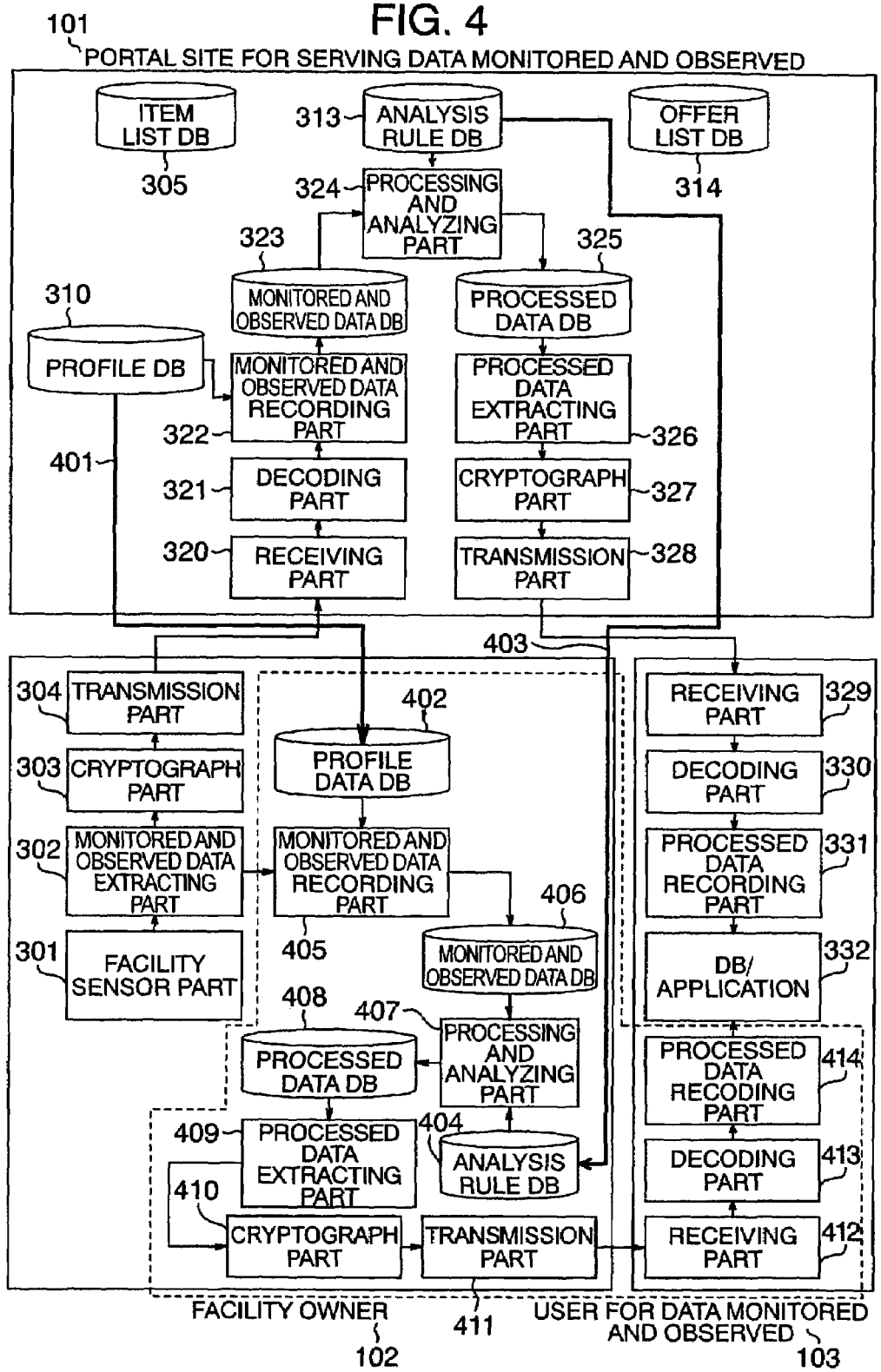
FIG. 4 is a schematic view illustrating a system configuration of a portal sited in a second embodiment of the present invention.

Explanation will be hereinbelow made of a second embodiment having a configuration in which the function of a part of the portal site is incorporated as a function on the facility owner side with reference to FIG. 4 which shows this configuration. Basically, all functions shown in FIG. 3 are incorporated in this configuration (although the all functions shown in FIG. 3 are not shown in FIG. 4 for the sake of convenience in the figure). Moreover, a group of functions in a zone defined by a dotted bold line is added. Like reference numerals are used to denote like parts to those shown in FIG. 3. Explanation will be hereinbelow made mainly of points different from those in the first embodiment.

At first, there is presented a synchronizing mechanism for data bases between the portal site 101 for serving data monitored and observed, and the facility owner 102. That is, the profile data base 310 on the portal site and a profile data base 402 on the facility owner side are synchronized with each other by a synchronizing mechanism 401. It is noted that the profile data base 402 is a subset in which the facility owner incorporating thereof stores only relevant data, and which cannot invade privacy of other facility owners. Similarly, the analysis data base 313 on the portal site and an analysis data base 404 on the facility owner side are synchronized with each other by a synchronizing mechanism 403. The process of data transmission is directly made from the facility owner side to the user 103 for using data monitored and observed is carried out on the basis of these data bases.

The process steps thereof are similar to those carried out by the portal site in the first embodiment. At first, a monitored and observed date recording part 405 selects data to be directly transmitted to the user 103 for using data monitored and observed, from data created by the monitored and observed data extracting part 302 in accordance with a profile data base 402, and stores the data in a monitored and observed data data base 406.

Next, in accordance with the analysis rule data base 404, a processing and analyzing part 407 creates processed data from data in the monitored and observed data data base, and stores the same in a processed data data base 408. The process and analysis at this stage are mainly, data processes relating to a single facility, such as concealing of data or digital filing. Since a statistic process among a plurality of facilities is carried out by the portal site, it is not carried out by the process on this route.

A processed data extracting part 409 gathers data extracted from the processed data data base 4 having been thus built up, and sets the same in a transmission configuration. There are a plurality of user for using data monitored and observed to which date are transmitted. In this case, the processed data extracting part operates for each of those to which data is transmitted. Finally, processed data is transmitted to the user 103 for using data monitored and observed by way of a cryptograph part 410 and a transmission part 411.

The user 103 for using data monitored and observed, to which data is transmitted receives the processed data through a receiving part 412 and a decoding part 413. The cryptograph part 410 and the decoding part 413 exclude unfair use by the third party with the use of a combination of peculiar asymmetric keys for each pair of the facility owner 102 and the user 103 for using data monitored and observed. Finally, the interface matching is taken by the processed data recording part 414, and data is delivered to a data base or an application for using the data.

As mentioned above, the portal site 101 for serving data monitored and observed shown in the second embodiment can directly transmit data from the facility owner 102 to the user 103 for using data monitored and observed. All merits of the portal site explained in the first embodiment can be also obtained, and moreover, it is possible to aim at reducing the volume of transmission and shortening the time of transmission. In the case of direct transmission alone, the portal site obliges to the provision of a monitoring system and a maintenance so as to have a meaning like to the out-sourcing of the build-up of the monitoring system. However, in the case of the portal site 101 for serving data monitored and observed, new clients can be looked up or materials for processed data having a high added value can be provided even after the observing system is built up. It can be anytime developed into the configuration of the first embodiment so as to obtain the advantages thereof. The provision of the flexible monitoring and observing system exhibits a greatest feature.

Explanation has been hereinabove made of the function framework for the portal site for serving data monitored and observed in which the present invention is applied. The practical effects of the system depend upon a kind of data set up on the framework. Explanation will be hereinbelow made of embodiments including configurations of the facility owner and he user 103 for using data monitored and observed.

Explanation will be hereinbelow made in more detail of a third embodiment in which a system carrying thereon monitored and observed data delivered from a Diesel generator facility belonging to the facility owner 102. Such a function that monitored and observed data is gathered from a Diesel generator, and is then processed in order to be served to the third party is constituted on a public transmission network.

Referring to FIG. 5 which shows a functional configuration around a facility at a site belonging to the facility owner 102. A facility sensor part is attached to each of parts of the Diesel generator facility. That is, a fuel valve opening degree sensor 501 is attached to a fuel valve, an exhaust temperature sensor 502 to an exhaust port, a speed sensor 503 to a rotary shaft, and an output power sensor 504 to an output end of the generator.

The outputs of the sensors are digitalized by an analog-digital converting mechanism 505 and a multiplexer 505, and are then processed by a digital computer composed of a CPU 507 and a memory 508. In the computer, data edition is made for inputs from the sensors, and the results thereby are transmitted onto a communication circuit 510 through the intermediary of a communication device 509. Thus, the data monitored and observed is obtained.

The monitored and observed data is transmitted in accordance with a predetermined data format. FIG. 6 shows an example of the data. In this embodiment, the XML format is used. Thus, a format having a sufficient redundancy is used for the data monitored and observed in order to variously process the data thereafter. Further, there is provided such a feature as to stipulate to handle event data such as the so-called alarm 601 which unsteadily occurs and sequential data which steadily occurs under a predetermined rule, as a record 602 are handled.

FIG. 7 shows an example of the profile data base managed by the portal site 101 for serving data monitored and observed. This data base is in general based upon an item list of data which can be obtained when a monitoring and observing means is installed in a facility. A disclosure profile is adapted to be designated for each of the items in the profile data base.

A data table 701 is adapted to handle data from a facility to be monitored and observed, and gathers fixed static data from each of facilities, such as a name of a facility owner, and a kind and a type of yearly produced commodity of the facility. Further, pointers of the list of items of monitored and observed data, with which data is stored for monitored and observed items is stored. By following the pointers, an item list 702 for the facility can be obtained.

The data table 702 is stored therein with characteristic data among the item of data monitored and observed for a single facility. Data tables 702 are provided for respective facilities to be monitored and observed by the portal site for serving data monitored and observed. As shown in FIG. 7, a name, a unit system and the like are set up for each of items of data monitored and observed. Further, whether an item of data monitored and observed is of sequential data which is managed mainly based upon time series or event data which is managed mainly based upon a state variation, is designated. As to the sequential data, intervals and degree of accuracy of obtained data can be designated. Further, pointers directed to data bases storing data of disclosure profiles are stored for the-respective items.

The sequential data and the event data have different meanings in view of not only packaging of a data storing method or the like but also the human side for handing the data. For example, as shown in FIG. 7, in the case of monitoring the opening degree of the fuel valve, data obtained therefrom is handled as sequential data. As to data stored in time series, the value for reusing data such as an averaged value over a certain time or a maximum or minimum value can be found. Meanwhile, data indicating a start and a stop of the generator are handled as event data. As to data stored for an event list incorporated with a time stamp, the value of reusing data can be found as to a frequency of status variation, intervals thereof and the like.

Thus, during reprocessing data, consideration is made as to rudimental classification into two kinds of data, that is, the sequential data and the invent data. Accordingly, from items in the list of items of data monitored and observed, a disclosure profile for sequential data and a disclosure profile for event data are referred to.

The data table 703 is an example of a disclosure profile of a sequential data type. The disclosure profile is prepared for each of the items of data monitored and observed. As to the content of the data table, a degree of disclosure of data is designated within a range among not less than one of defined disclosure ranges. The degree of disclosure consists of several items, and has a structure which is different between the sequential data and the event data. In the case of the sequential data, what fine time intervals can time series data be disclosed at, as to a data size, what early time can the data be disclosed after monitoring and observation at, as to freshness of data, and whether results of statistic processes including maximum and minimum values and an averaged value can be disclosed or not are designated so as to determined a degree of disclosure of the data. Further, whether or not the disclosure of data can be made without making an address and a name of a facility to be monitored and observed, clear, and whether or not data can be used in a statistic process with respect to other facilities can be designated.

The data table 704 is an example of the disclosure profile of the event data. The disclosure profile of this kind is prepared for each of event data types among the items of data monitored and observed. In the case of the event data, no consideration is made for a size of data, but a degree of accuracy of a time stamp obtained for each of events is designated. Further, the consideration as to a statistic process is different, and accordingly, the content of disclosure can be disclosed as to statistic data such as a frequency of events and time intervals among events. Consideration to the secret and the freshness of data is similar to that in the case of the sequential data.

Thus, with introduction of disclosure profiles for the sequential data type and the event data type as general types for data monitored and observed, the portal site for serving data monitored and observed can uniformly handle all data monitored and observed. There is used such a configuration that the presentation of a disclosure profile which is exchanged between the portal site for serving data monitored and observed and the facility owner, and the designation of the content can be carried out efficiently carried out on a computer system which is connected up through network.

Referring to FIG. 8 which shows an image display and an input function within the facility owner 102, these correspond to the transmitter-receiver part 308 and the image display part in the system configuration shown in FIG. 3. An internet function is incorporated on the so-called personal computer 801. With the use of input devices such as a keyboard 802 and a mouse 903 and with an image output on a CRT 804, the operation is progressed, and a WWW browsing environment is arranged in order by way of a communication device 805 and a communication circuit 806. Thus, the facility owner, in particular, a manager can obtain an environment for designating a disclosure profile with the use of a configuration of inexpensive equipment which are commercially available in general.

With the configuration of equipments shown in FIG. 8, a disclosure profile format can be presented by the portal site for serving data monitored and observed, and the disclosure profile is designated by the facility owner. These can all be made on line. An image display which is used for the above-mentioned operation is shown in FIG. 9.

An image display 90 is presented for a facility owner who has received an authentication by inputting a user ID and a password. At first, a list of facilities managed by the facility owner is displayed on a box 902 of a scroll type, and accordingly, a facility for which a disclosure profile is designated is selected from the list. Then, a list of items relating to the selected facility is displayed in a box 603. Among these items, the one for which the disclosure profile is designated is selected. With this configuration, by depressing a button 904, a designation image for individual disclosure profiles is separately displayed on one and the same image screen device.

Referring to FIG. 10 which shows an example of a designation image of a disclosure profile, an image 1001 is displayed for the item of data monitored and observed, which has be selected on the image 901. A name of a facility owner, a name of a facility and an item of data monitored and observed are clearly Indicated in the image. Under this condition, a disclosure profile for a relevant item of data monitored and observed is designated. At first, the range of disclosure is selected from a box 1002 of a scroll type in which a list of candidates is presented. Further, the selected range of disclosure is set by selecting and manipulating one of check buttons 1003 enumerated in the lower part of the image. Through this setting, the content of the disclosure profile shown in FIG. 7 is determined. An equivalent which can be obtained by the facility owner is at once displayed in a text box 1004 in accordance with a degree of disclosure for secondary use data set on this image. The facility owner aims at making a decision in accordance with a degree of disclosure. Finally, he determines the content of the disclosure of data, and thereafter, he depresses a button 1005 so as to carry out the setting of the disclosure profile.

The portal site for serving data monitored and observed sets up a plan for processing data on the basis of the designation of the disclosure profile, and, as a result, advertises for data users as to an item of data (secondary use data) to be acquired in future. The advertisement for data users can be made by presenting the offer list to data users as candidates, as in the embodiments mentioned above. Referring to FIG. 3, it is made by using the transmitter-receiver part 317 and the image display/input part 318 belonging to the facility owner. The configuration of the equipments is similar to that shown in FIG. 8. A data user can make the presentation of an offer list and a contract for the use as indicated by the process steps 206 and 207 shown in FIG. 2, with the use of the configuration of inexpensive equipments which have been commercially available in general.

Figure 11:
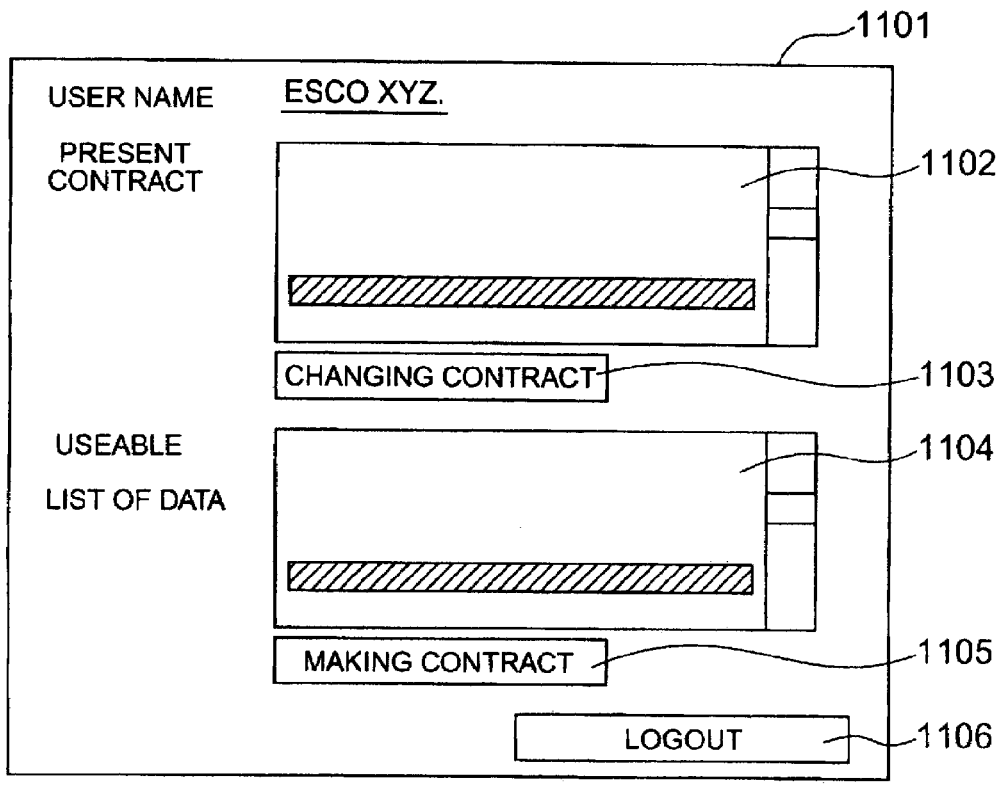
FIG. 11 is a view illustrating an image of a list of items of disclosure in the third embodiment of the present invention.

Referring to FIG. 11 which shows an example of an image for disclosure of the offer list, a data user can acquire respective data from an image 1101. A list of contracts made at present is displayed in a box 1102 of a scroll type from which a contact having been made at present and relating to processed data still acquired at present can be confirmed. Even if the contract having been made is to be changed, a button 1103 is depressed so as to shift the contract selected in the above-mentioned box 1102 into a changing procedure. Basically, the change of the contract is the same as a procedure of making a contract which will be hereinbelow explained, and accordingly, the explanation thereof is omitted. A list of contracts as candidates which can be made at present is displayed in a box 1104 of a scroll type. If there is presented desired data in this box, the item thereof is selected in the box 1101, and then a button 1105 is depressed so as to shift into the procedure of making a contract. If either the contract is not changed or new contract is not made, a log-out is made by using a button 1106.

Figure 12:
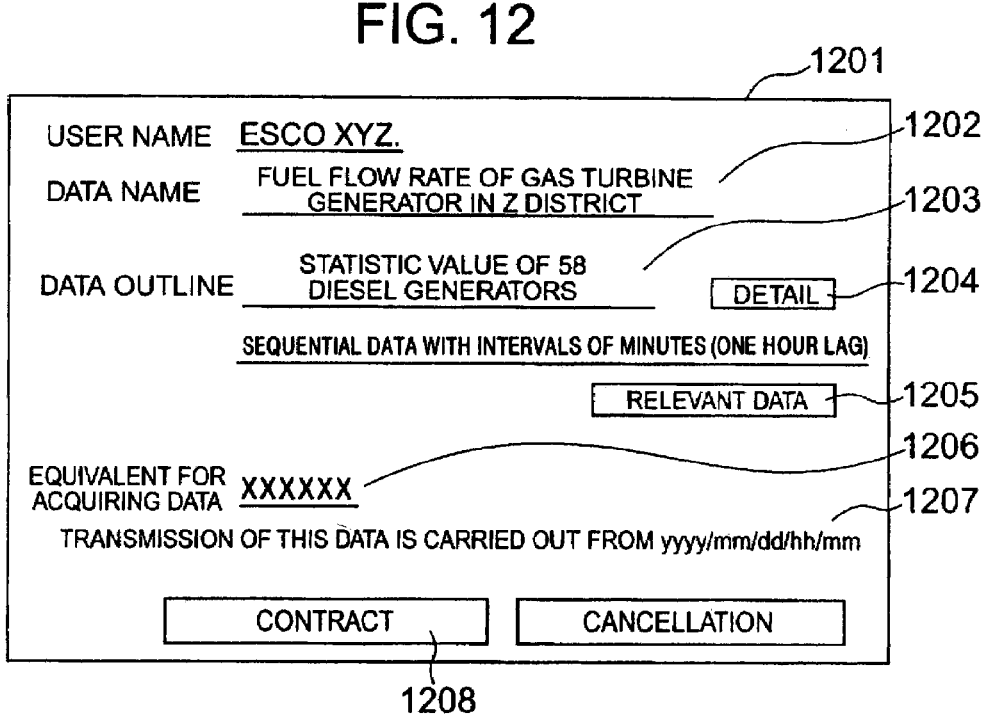
FIG. 12 is a view illustrating an image of a contracting procedure in the third embodiment of the present invention.

Referring to FIG. 12 which shows an example of an image for making a contract, an image 1201 is displayed for each item of processed data as a contract candidate. An item of data selected on the image of the offer list shown in FIG. 11 can be confirmed from a data name 1202.

In addition, an essential point of data monitored and observed, which is a raw material for obtaining processed data is indicated as an data outline 1203 in the image 1203. As required, a button 1204 is depressed, and accordingly, detailed data can be extracted. In an example as shown, detailed data for 58 Diesel generators can be referred to. However, disclosed data from a facility is limited to such a case that a facility owner has allowed for the disclosure. As to the data outline 1203, sequential data or event data is explicitly indicated for classification of data. For the sequential data, a degree of time intervals and a time lag of disclosure are indicated. A data user makes a decision as to the use of the data with reference to the content of the display. If the outline of data is different from that desired one more or less, a button 1205 is depressed in order to check a list of items of similar data, that is, the manipulation of the image of disclosure of the offer list can be returned to the process of selecting data, similarly. On the contrary, if the data is the desired one, after the indication 1206 of an equivalent and the indication 207 of a time of initiating data transmission are confirmed, a button 1208 is depressed in order to make a contract. Data transmission is carried out for the data user for which the contract have been made, from an appointed time indicated in the image, through the functions of the transmission part 328 and the receiving part 329 shown in FIG. 3. A third part which has not yet make any contract cannot acquire any processed data due to the cryptographic function.

In the third embodiment as mentioned above, explanation has been made of the configuration of the system in which data monitored and observed, from the Diesel generator facility is packaged on the framework as explained in the first embodiment or the second embodiment. An example of the configuration of the contract on the system will be explained with reference to FIG. 13. A portal site for serving data monitored and observed, has made a contract by way of a communication circuit 1302 with respect to the monitoring and observation of Diesel generator facilities 1303 installed in a Z district.

Figure 13:
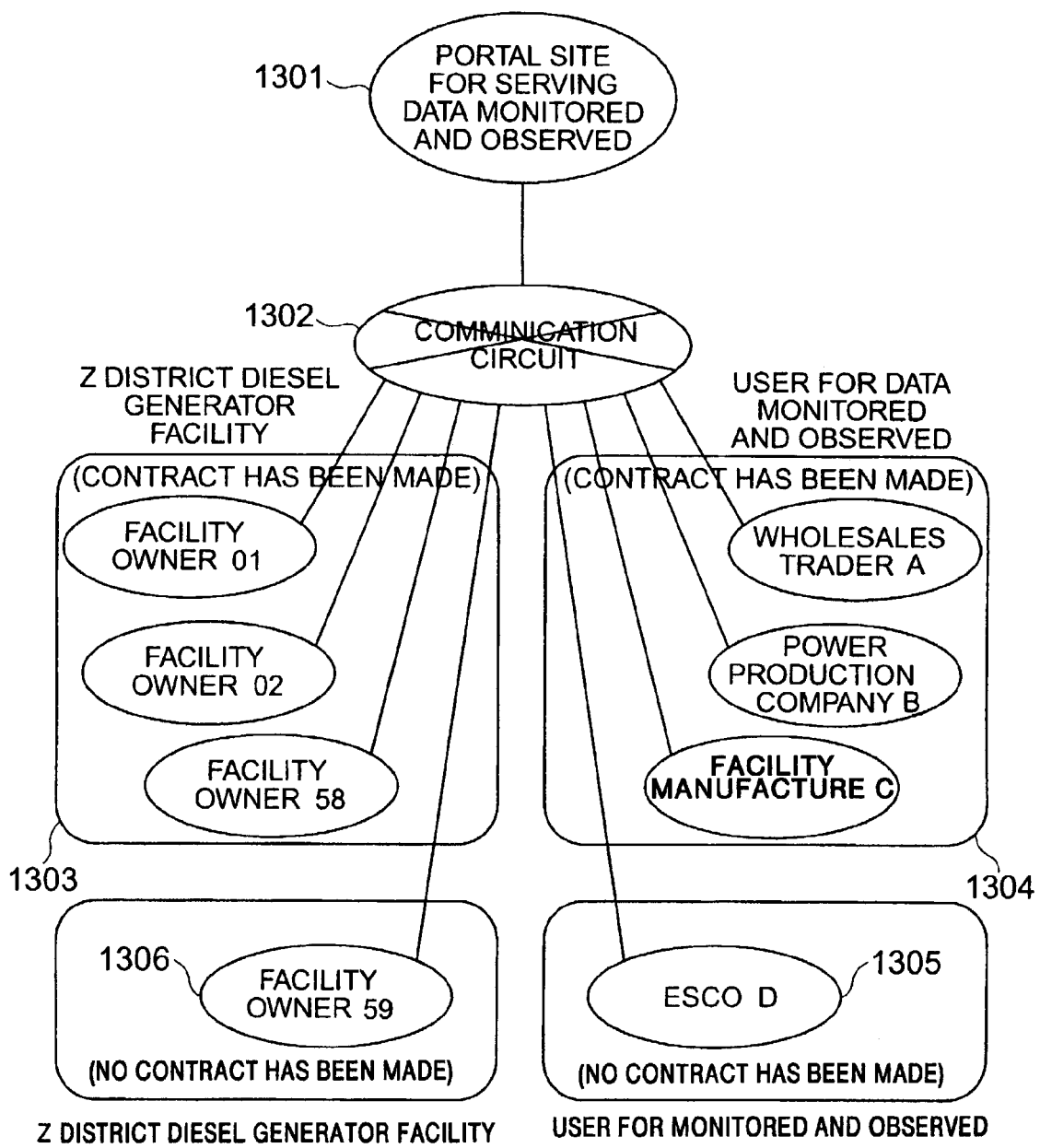
FIG. 13 is a view illustrating a configuration of a practice in the third embodiment of the present invention.

Referring to FIG. 13, the monitoring and observing service is carried out for 58 Diesel power plant facilities, similar to the example shown in FIG. 12. At the same time, disclosure profiles have been designated by facility owners for the respective facilities, and accordingly, several processed data have been served to data users until now. In FIG. 13, processed data or secondary use data is served to data users 1304 who have made contacts. Data is, for example, sequential data of fuel flow rates as shown in FIG. 12. Secondary use data obtained therefrom can be used by the several data users in view of several stand points. That is, a wholesale trader for crude oil uses the data so as to grasp demands among districts on a real time base, an electric supplier uses data so as to grasp an operating state of his power plant facility, or a facility manufacturer who has manufactured the Diesel power plant facilities uses the data as data for managing the operating histories and as data for remote maintenance and diagnosis.

Thus, data from a single facility can be effectively used for secondary use data by several data users, and simultaneously, a single data user effectively use data from several facilities. A portal site 1301 for serving data monitored and observed acts as an agent for this exchange.

Important technical effects are such that on-line data is exchanged through the above-mentioned exchange while the configuration of a contract is anytime updated after the build-up of the system so as to change the degree of effective use of the data. For example, if an ESCO trader 1305 as a new demander 1305 for using data makes a contact with the portal site 1301 for serving data monitored and observed, newest observed values are served as secondary use data to the ESCO trader just after the completion of the contract. Further, an equivalent to the data which would be paid to the portal site 1301 for serving data monitored and observed from the new contractor is adapted to be indirectly recompensed to the facility owner. That is, the facility owner can effectively reuse the data anytime.

If new facility owners 1306 build up systems for monitoring and observing their facilities, between themselves and the portal site 1301 for serving data observed and monitored, a plurality of items of new processed data are created by the portal site 1301 for serving data monitored and observed. The items of processed data are disseminated to all data users in the form of a list. Accordingly, a facility owner who builds up a new monitoring and observing infrastructure at once connects to several data users who therefor can acquire secondary use data. In other words, a data user can at once acquire data from a facility for which a new monitoring and observing infrastructure is set up in order. Thus, remarkable technical effects can be brought about for both facility owner and data user. Further, the portal site 1301 for serving data monitored and observed can itself indirectly gain the corresponding equivalent from both facility owner and data user.

Next, explanation will be made of a fourth embodiment which is a system different from that of the third embodiment. The framework is the same as that explained in the first and second embodiments, that is, similar to that explained in the third embodiment.

In the fourth embodiment, a system on which data monitored and observed, which is obtained from an elevator is packaged will be explained. Such a function that data monitored and observed, for a stream of persons through an elevator system is gathered up, and is secondarily processed into secondary data which is then served to a third party is set up on a public communication network.

FIG. 14 shows a functional configuration around a facility in a site belonging to the facility owner 102. This system has a purpose of detecting volumes of streams of persons through an entrance of a building and in the building. Similar to the configuration shown in FIG. 5, which has been explained in the third embodiment, the system 1401 composed of a transmission part, a monitored and observed data extracting part, a cryptograph part and a facility sensor part is installed for transmitting and receiving data to and from the portal site 101 for serving data monitored and observed, A person stream sensor 1402 for measuring a volume of a stream of persons at the entrance of the building is incorporated for the facility sensor part. In this embodiment, different from the configuration of the third embodiment, data communication is made with an instrument system for an existing facility in a site. Data from the person stream sensor 1404 at every story, belonging to an existing elevator control system 1403 is effectively used.

The transmission part 1406 is connected to an interface part 1405 of the existing instrument system, Date transmitted from the instrument system through a transmission path is processed by a receiving part 1407 at a remote position. Through the process by the receiving part 1407, data from the existing instrument system is converted. With this arrangement, without the provision of a new sensor, a volume of a stream of persons at every story in the building to be monitored can be treated as data monitored and observed.

Accordingly, the data monitored and observed which is transmitted from the function in the facility owner, is handled in a way similar to that of the third embodiment, and is transmitted in accordance with a predetermined data format as the example shown in FIG. 6. It is stipulated that event data which is noninvariantly produced and sequential data which is produced invariantly are handled. In the case of the fourth embodiment, since only a number of passengers per min is treated as a volume of a stream of persons, it is stipulated with only sequential data 1501. Of course, if another kind of data monitored and observed is used with the device shown in FIG. 14, event data is also to be handled.

A profile data base for managed by the portal site for serving data monitored and observed also has a framework similar to that of the third embodiment, and is similar to the example shown in FIG. 7. The case of the fourth embodiment is shown in FIG. 16. Date from a facility to be monitored and observed has a framework exactly similar to that of the data table 701 shown in FIG. 7. Further, data from other various kinds of facilities can be synthetically handled as secondary use data. In this embodiment, a data table 1601 is packaged in such a form that columns are added to the data table 701.

Similar to FIG. 7, pointers for items of data monitored and observed, with which data is stored for items of data monitored and observed, acquired from facilities are stored for the respective facilities. By following the pointers, an item list can be obtained.

In the case of the fourth embodiment, characteristic data relating to a plurality of observed values of streams of persons in a single building are stored in a data table 1602. These items of data monitored and observed are designated as sequential data. Further, pointers for a data table storing data of a disclosure profile are stored for the respective items.

A data table 1603 is an example of a disclosure profile of a sequential data type. The framework thereof is completely similar to that of the data table 703 shown in FIG. 7. In the case of the fourth embodiment, no disclosure profile of an event data type is used for monitored and observed values in a facility in the building. The configurations of sequential data and event data as data monitored and observed are changed as necessary. These configurations are determined during the formulation of a list of items. When it is received, the disclosure profile corresponding to the items of data monitored and observed is suitably and automatically introduce. The presentation of a disclosure profile format which is exchanged between the portal site for serving data monitored and observed and a facility owner, and the designation of the content thereof are also efficiently carried out on a computer system connected up by a network.

At this stage, an environment with which the facility owner or the manager in particular designates a disclosure profile exhibits a configuration shown in FIG. 8 as explained in the third embodiment. In general, with an inexpensive WWW browsing environment which is commercially available in general, a desired designating manipulation can be made.

At this time, the exchange on-line is exactly similar to that of the third embodiment. Accordingly, the facility owner (manager) carries out the manipulation for selecting a facility and an item for designating a disclosure profile when the image shown in FIG. 9 is presented. An image for designating individual disclosure profiles is separately displayed on one and the same image device.

A designation image of the disclosure profile in the third embodiment is exactly similar to that of the example (FIG. 10) in the third embodiment. That is, at the portal site for serving data monitored and observed, this process is uniformly and automatically carried out on-line.

The advertisement for data users, is carried out by presenting an offer list to data users as candidates, exactly similar to that of the third embodiment. The configuration of the image has a framework the same as that in the example (FIG. 11) of the image of the disclosure of the offer list, and that of the example (FIG. 12) of the image of the procedure of making a contract.

FIG. 17 shows an example of an image of making a contract in the fourth embodiment. Processed data can be obtained from observed values of a stream of persons in the building. As the data name 1202 in the image 1701 indicates, a number of persons who go into and out from buildings in a certain area is prepared as a commodity. As indicated in a data outline 1703, this value is calculated as a statistic value which can be obtained from person stream sensors provided at entrances of five buildings in the above-mentioned area. Similar to the third embodiment, detailed data can be extracted as required. As to this sequential data, that is, secondary use data, an instant value, that is, data with no lag is presented. Accordingly, a data user who has made a contract to buy the data can grasp a stream of persons in a certain area on time. The procedure of the contract is similar to that of the third embodiment. Data transmission is made for a data user who has made the contract through the intermediary of the functions of the transmission part 328 and the receiving part 329 shown in FIG. 13 at the appointed time indicted by the image. Only the user who has made the contract can acquire the data on-line and on time.

Next, FIG. 18 shows an example of processed data which is different from the example shown in FIG. 17. As shown by a data name 1802 and a data outline 1803 in an image 1801, a volume of a stream of persons at a fifth floor of a specified building is prepared as a commodity. This is sequential data with intervals of minutes, and a item of data with a time lag of 1 hour for the purpose of guard security in compliance with an intent of a facility owner. Different from extremely statistic data shown in FIG. 17, as to such individual data, a user who is going to make a contact can designate further processing of data. By depressing a button 1804, it is shifted into an image for designating a method of reprocessing the above-mentioned volume of a stream of persons.

Figure 19:
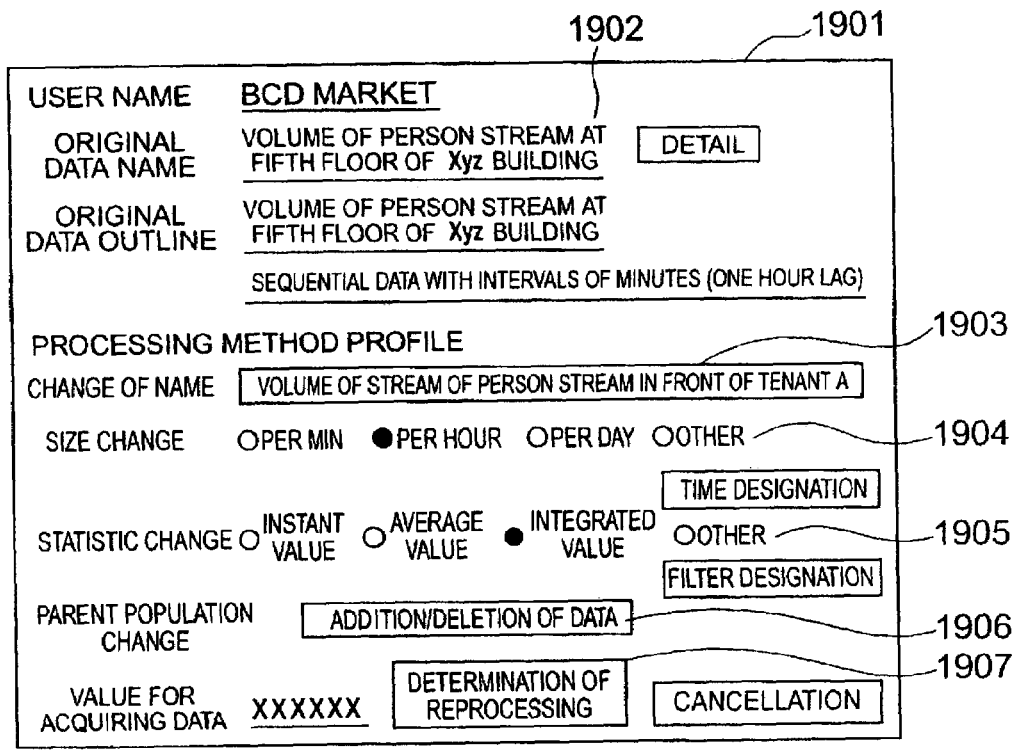
FIG. 19 is a view illustrating an image of a demand of reprocessing in the fourth embodiment of the present invention.

FIG. 19 shows an example of an image for demanding reprocessing. An image 1901 can be displayed by the button 1804 in the image 18. In this image, an original data name and an original data outline which are presented in the image 18 are indicated in the form of a text 1902. With the use of this as a base, a manipulation of inputting a processing method profile in the bottom column of the image is carried out. A name of data after reprocessing is designated by a text input position 1903. Thereafter, as to sequential data, a change of the time intervals of time series data is designated by a size change designation 1904, and then the content of a statistic process is changed by a statistic change designation 1905.

In this embodiment, as to the size change, data with original intervals of minutes can be changed into data with intervals of one hour or data with intervals of one day. If it is desired to designate other intervals, an input image is adapted to be separately displayed. As to a statistic change, whether or not observed values are directly used, whether or not an average value thereof is used, or whether or not an integrated value thereof is used can be designated. If another computing system is used, an additional image is displayed and an computing filter is designated or inputted. Further, the parent population of the computation can be changed. Although the volume of a stream of persons at fifth floor is solely handled In FIG. 18, a value on another floor can be added to this volume. This operation can be designated by selecting a relevant data item in an image which is displayed by depressing a button 1906. Thus, after inputting a processing method profile position, the designation of a reprocessing method is completed by depressing a button 1907, and the image of the procedure of making a contact is again displayed.

Figure 20:
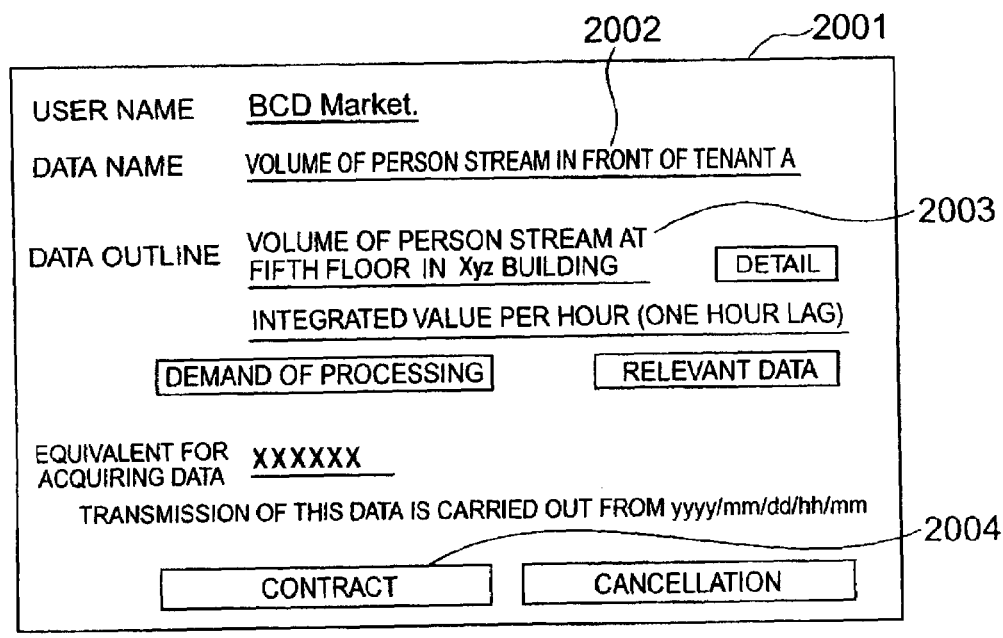
FIG. 20 is a view illustrating a screen of a contracting procedure (after demanding the reprocessing)

FIG. 20 shows an image of a procedure of making a contact for completion of designation of reprocessing made in FIG. 19. An image 2001 is changed from an image 1801 by depressing the button 1907 in the image 1901. A data name 2002 is changed. Further, as understood from a data outline 2003, a data processing method is changed by the designation in FIG. 19. Thus, a data user can make a contract by depressing a button 2004 after he inputs reprocessing of data in a format desired by himself. These processes are adapted to be automatically made between computers connected on a network, thereby it is possible to effectively use a data with mobility.

Figure 21:
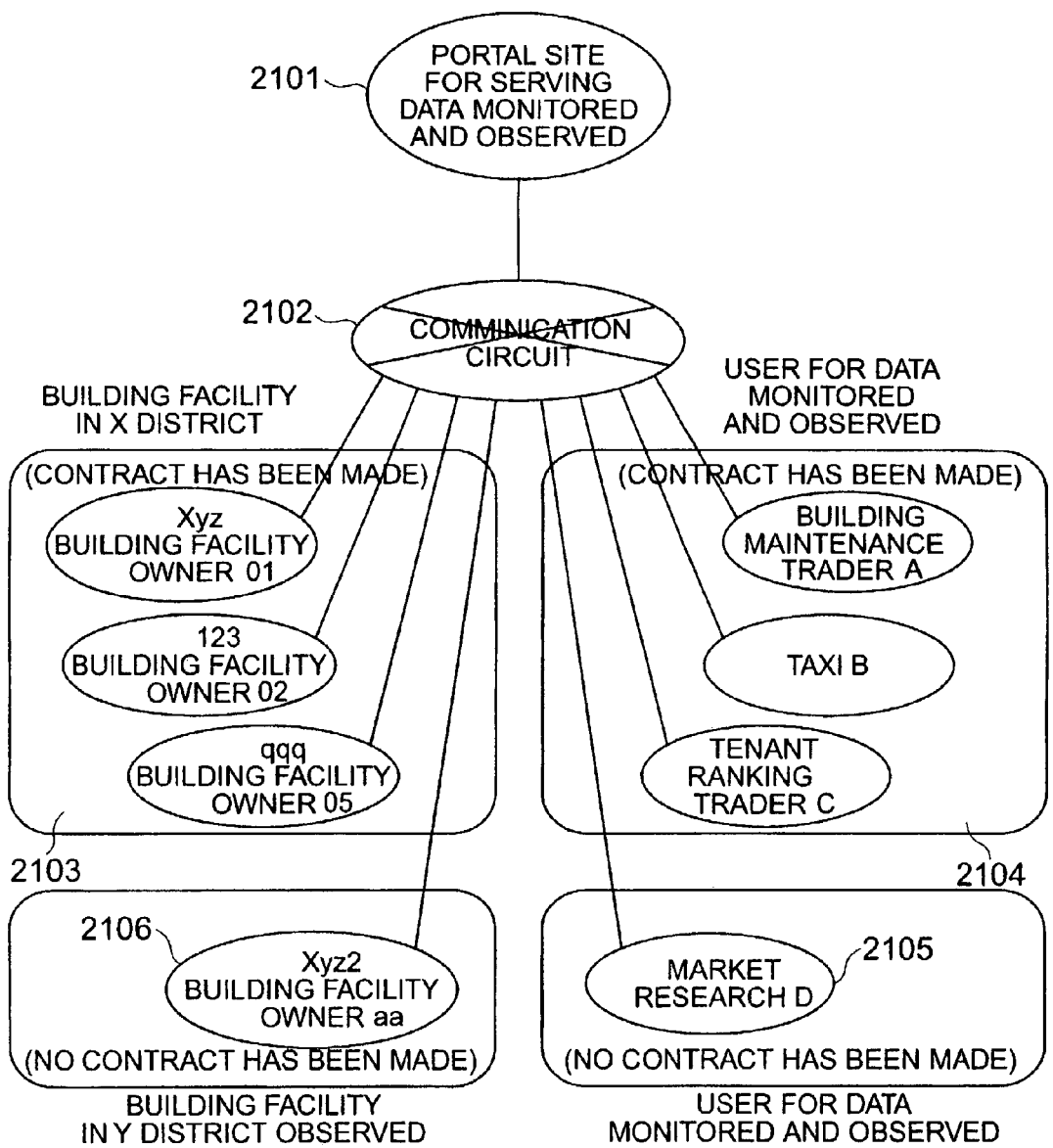
FIG. 21 is a view illustrating a configuration of a practice in the fourth embodiment of the present invention.

In the fourth embodiment as mentioned above, similar to the third embodiment, explanation has been made of the configuration of the system in which observed data of a stream of persons belonging to an elevator system in a building facility is packaged on the framework explained in the first and second embodiments. Explanation will be hereinbelow made of an example of a configuration of a contract on this system with reference to FIG. 21. A portal site 2101 for serving data monitored and observed has made a contract with building facilities 2103 installed in an X district for monitoring and observation by way of a communication circuit 2102. Monitoring and observing services are carried out for building facilities at five positions. Simultaneously, the designation of disclosure profiles have been presented by respective facility owners, and several processed data have been served to data users until now. In FIG. 21, processed data is served to data users 2104 who have made contracts. Several data users have used the data with their respective view points. A building maintenance trader uses an integrated value of a stream of persons every day as a reference value for adjusting intervals of the maintenance, a taxi trader uses an instant value of the volume of a stream of persons every day as an input value of a vehicle allocation system for optimizing the acquirement of customers, or a tenant ranking company effectively uses an integrated value of a stream of persons every hours as an input data for a system for ranking commercial values among days or weeks or among time zones for tenants. Similar to the third embodiment, several users can effectively use data from a single facility, and simultaneously, a single data user can effectively use data from several facilities. The portal site 2101 for serving data monitored and observed serves an agent for the exchange of the data.

Further, a marketing research trader a new demander 2105 for using data is going to make a contract with the portal site 2101 for serving data monitored and observed after the system is built up. The market research trader has such a plan that a volume of a previous stream of persons in front of each of various kinds a sails tenant is gained in order to use the volume as a reference for altitude survey of sales goods thereof. If a contract to acquire an instant value of the volume of a stream of persons is made, a newest observed value is served to the market research trader just after the completion of the contract. Accordingly, the result of analysis by this market research trader becomes valuable intense data for a producer therefor and a physical distribution trader.

Further, in such a case that a new facility owner sets up a monitoring and observing system between himself and the portal site 2101 for serving data monitored and observed, a plurality of items of new processed data are formulated. In the case of FIG. 21, an Xyz2 building in another district Y is going to set up a monitoring and observing system as a new facility 1206. This Xyz building has a trade the same as that of a Xyz building in the X district. In this case, items of processed data which effectively use this category are formulated, and are disseminated in the form of a list.

Even in FIG. 21, technical effects completely similar to those in the case of FIG. 13 can be obtained. A facility owner who builds up a new monitoring and observing infrastructure can at once connect to several data users, and in other words, a data user can at once acquire data from a facility which has set up a new monitoring and observing infrastructure. The portal site for serving data monitored and observed itself can indirectly gain an equivalent corresponding to the data from both the facility owner and the data user.

Figure 22:
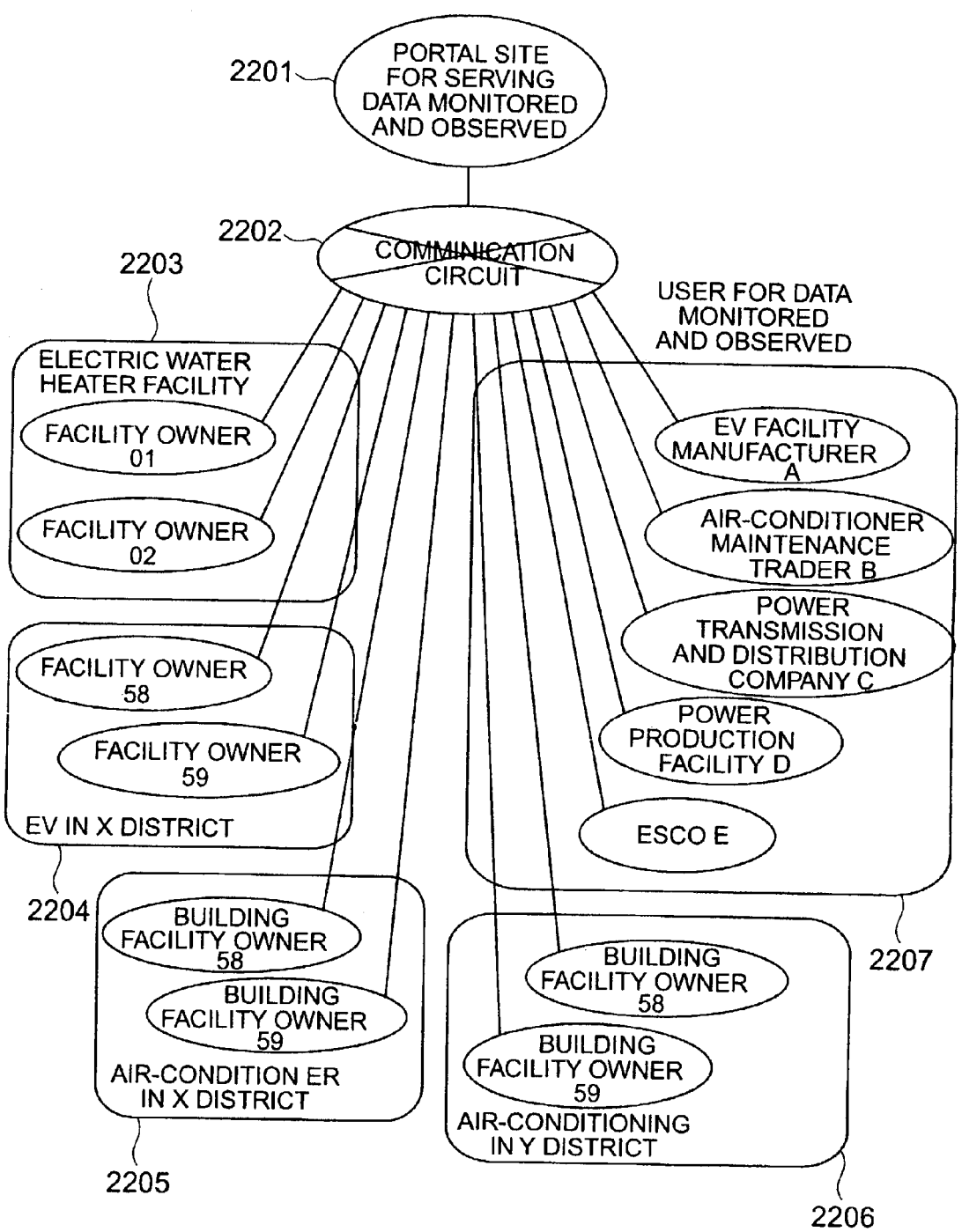
FIG. 22 is a view illustrating a configuration of a practice in a fifth embodiment of the present invention.

The contents explained in the third embodiment and the fourth embodiment are taken from actual configurations in which data from a certain kind of a monitoring and observing system are effectively used by several kinds of data users in a way different from the conventional way. In a fifth embodiment, consideration is made such an actual configuration that data from conventionally several kinds of monitoring and observing systems are gathered up in the portal site for serving data monitored and observed, according to the present invention, and on-line data is severed to several kinds of data users with a new data value. Similar to the third embodiment and the fourth embodiment, the system is built up on the framework explained in the first and second embodiments. FIG. 22 shows the actual configuration.

A portal site 2201 for serving data monitored and observed has made contracts through a communication circuit 2202 with an electric water heat facilities 2203 installed in an X district, electric vehicles (which will be referred to as an EV facilities) 2204 which mainly use a charge unit installed in the X district, an air conditioning facilities 2205 installed in the X district, and air-conditioning facilities 2206 installed in the Y district. Electric water heaters in the electric water heater facilities 2203 are those which receive overnight supply power from a gross-area power system so as to produce and reserve hot water, and supply hot water in the day time. The EV facilities 2204 are vehicles which charge batteries with power from the gross-area power system, and electrically run. The air-conditioning facilities 2205 and 2206 are in general composed of package air-conditioners. The portal site 2201 for serving data monitored and observed carries out monitoring and observing services for several objects as to several kinds of facilities. Further, it has received the designation of disclosure profiles from respective facility owners, and serves several kinds of process data to several kinds of data users. In this embodiment, processed data created from data monitored and observed, relating to the above-mentioned several kinds of facilities are served to data users 2207 who have made contracts. As shown in FIG. 22, data is disseminated to an EV facility manufacturer, an air-conditioner maintenance trader, a power transmission and distribution company, a power production company and an ESCO trader. An EV facility manufacturer is a trader who undertakes a manufacture of EV facilities 2204. The air-conditioner maintenance trader undertakes maintenance of the air-conditioning facilities 2204 and the air-conditioning facilities 2206. The power transmission and distribution company is a trader who supplies power to the X district. The power production company is a trader who can wholesale power to the power transmission and distribution company. The ESCO trader undertakes consulting as to an energy saving process in the X district and the Y district.

At first, data monitored and observed relating to the EV facilities 2204 is served to the EV facility manufacturer. Observed data for running patterns, motor torques and the like as sequential data, and several kinds of alarms, outputs from soundness check mechanisms and the like as event data are handled. The EV facility manufacturer carries out remote monitoring for products developed by himself, and feeds back thus obtained data to several kinds of quality controls and designs in order to aim at enhancing the quality of products manufactured by himself. The portal site 2201 for serving data monitored and observed serves as an agent for exchanging data so as to gain a service charge as an equivalent.

Next, data monitored and observed from the air-conditioning facilities 2205 in the X district and the air-conditioning facilities 2206 in the Y district is served to the air-conditioner maintenance trader who has made a contract to receive a failure signal as event data on-line and on-time, and who has built up a system which allows a service man to rush to a site in accordance with the signal. Further, in addition, he acquires operation rates as sequential data from the X district, the Y district and like. With the use of a data reprocessing demand function of the portal site 2201 for serving data monitored and observed, difference values of the operation rates for every district are acquired every day. With reference to the data, the planning of allocation of service mans is formulated so as to aim at enhancing the efficiency of business. The portal site 2201 for serving data monitored and observed serves an agent for exchanging the data and data reprocessing so as to gain service charges as equivalents.

Next, data monitored and observed from the facilities in the X district such as the electric water heater facilities 2203, the EV facilities 2204 and the air-conditioning facilities 2205 is served to the power transmission and distribution company. In order to foresee a future overnight power consumption, data from the facilities are effectively used. A day time consumption of hot water is grasped from operation rates of the electric water heater facilities 2203, and a value estimating the power consumption of the water heaters in the next night is obtained. Similarly, a value estimating a volume of charge in the night of a day from travel distances of the EV facilities 2204 in the day time of the day is obtained. A heat radiation value of an ice storage system which is a facility other than those to be monitored and observed, in the day time is estimated with reference to values of data monitored and observed obtained from the air-conditioning facilities 2205, and a degree of electric energy which will be consumed in the night time of the day is estimated with reference to the heat radiation value. The operation rates and integrated values in the respective facilities are handed as sequential data so as to obtain empirical converting values from which the overnight power consumed in the night of the day is estimated. The above-mentioned process is carried out for the electric water heater facilities, the EV facilities and the ice storage devices, and thus obtained values are added together and then are multiplied with correction factors so as to obtain sequential data which is used as a foreseen value as a night time power consumption in the X district in its entirety. The above-mentioned computations are all carried out by the data reprocessing demand function of the portal site 2201 for serving data monitored and observed. Thus, since the night time power consumption in the night time of the day can be estimated, efficient maintenance services for the power transmission and distribution facility can be made. The portal site 2201 for serving data monitored and observed serves as an agent for exchanging data and reprocessing data so as to gain service charges as equivalents.

The thus obtained foreseen value of the night time power consumption in the X district is resoled also to the power production company. The power production company sets up a strategy for a long time contract or a short time contract as to future wholesales. The portal site 2201 for serving data monitored and observed gains a service charge as an equivalent for an agent for exchanging the above-mentioned data. Further, the power transmission and distribution company and the power production company can enjoy an effect of reducing the service charges with the use of processed data of the same kind.

Further, a part of data monitored and observed relating to several kinds of devices as mentioned above, is served to the ESCO trader who effectively use all data for consulting a diagnosis of energy saving, and an energy saving system. Facilities which raise problems in the operation rates of the respective facilities and the operation patterns thereof are subjected to screening so as to effectively use the data for business activities. It is noted that the name of the facility is anonymous due to the will of the facility owner, in view of a security problem. These data are served to the ESC trader as one king for attitude survey. The data monitored and observed, which is effectively used by the ESCO trader relates to the facilities each having a monitoring and observing infrastructure which has already set up, and are resold by all other users who have prepared the data. Both parties who resell and be resoled, can enjoy an effect of lowering data using charges. In any case, the portal site 2202 or serving data monitored and observed can gain a service charge as an equivalent to an agent for exchanging the data.

Thus, even in FIG. 22, similar to the case shown in FIG. 13 or 21, the facility owner who builds up a new monitoring and observing infrastructure, can at once connect several data users. Further, a data user can at once acquire data from a facility which sets up a new monitoring and observing infrastructure. The portal site 2201 for serving data monitored and observed, itself can indirectly gain equivalents corresponding to the data, from both facility owner and data user.

According to the present invention, not only the monitoring and observation can be carried by the portal site for serving data monitored and observed, instead of the facility owner, but also processed data which is prepared from the result of the monitoring and observation with the use of various computations including statistic computation can be prepared. Further, the data can be used by several data user in the form of secondary use data, thereby it is possible to gain the value of data which has been not utilized, as an economical equivalent.

On the contrary, the data user can acquire data from various kinds of facilities, and secondary use data obtained by processing the former data. These data can have a real time configuration or a nearly real time configuration within a range allowed by the facility owner. In view of this point, in comparison with processed data which has been conventionally gathered up by human hands, the value of the data can be jumped up.

The portal site for serving data monitored and observed site serves as an agent for exchanging the above-mentioned data, and manages security and secret, thereby it is possible to provide services for both facility owner and data user.

It should be further understood by those skilled in the art that the foregoing description has been made on embodiments of the invention and that various changes and modifications may be made in the invention without departing from the spirit of the invention and the scope of the appended claims.

What is claimed is:

1. A method of using data monitored and observed through a portal site connected to a computer network, comprising steps of:

determining, at the portal site, a data disclosure profile defining an allowable time range within which sequential data in time series obtained in future by monitoring and observing operation of a facility on a facility owner side is disclosed to a data user side, in view of a qualification and request of the data user and under a contract with the data user;

processing, at a portal site, received sequential data in time series regarding operation of the facility observed and monitored on the facility owner side, into a secondary data to be disclosed to the data user within the allowable time range defined by the data disclosure profile; and onerously serving the secondary data to the data user from the portal site through the computer network.

2. A method as in claim 1, further comprising:

formulating, by a computer, an offer list of secondary use data which is to be obtained from the data monitored and observed in future, by the portal site for serving data monitored and observed;

advertising the offer list, on the portal site via the network by computer, for data users who desire to use the data monitored and observed; and successively transmitting a newest value of the secondary data to a user who has made a contract by a computer.

3. A method of using data monitored and observed through a portal site connected to a computer network, comprising steps of:

obtaining, at the portal site, a right to onerously acquire sequential data in time series in future, by monitoring and observing operation of a facility on a facility owner side;

determining, at the portal site, a data disclosure profile which defines an allowable time range of the sequential data regarding operation of the facility in time series, monitored and observed on the facility owner side in future, which is to be disclosed to a data user side, in view of a qualification and request from the data user side and under a contract with the data user side;

processing, at the portal site, the sequential data regarding operation of the facility monitored and observed on the facility owner side into secondary data to be disclosed to the data user within the allowable time range defined by the data disclosure profile; and onerously serving the secondary data to the data user from the portal site by way of the computer network.

4. A method as in claim 3, further comprising:

formulating, by a computer, an offer list of secondary use data which is to be obtained from the data monitored and observed in future, by the portal site for serving data monitored and observed;

advertising the offer list, on the portal site via the network by computer, for data users who desire to use the data monitored and observed; and successively transmitting, by way of the computer network, a newest value of the secondary data to a user who has made a contract by a computer.

* * * * *